United States Patent
Merza et al.

(10) Patent No.: US 11,134,094 B2
(45) Date of Patent: *Sep. 28, 2021

(54) DETECTION OF POTENTIAL SECURITY THREATS IN MACHINE DATA BASED ON PATTERN DETECTION

(71) Applicant: SPLUNK INC., San Francisco, CA (US)

(72) Inventors: Munawar Monzy Merza, Albuquerque, NM (US); John Coates, Berkeley, CA (US); James M Hansen, San Ramon, CA (US); Lucas Murphey, Wadsworth, IL (US); David Hazekamp, Tinley Park, CA (US); Michael Kinsley, San Francisco, CA (US); Alexander Raitz, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/777,544

(22) Filed: Jan. 30, 2020

(65) Prior Publication Data

US 2020/0169579 A1    May 28, 2020

Related U.S. Application Data

(63) Continuation of application No. 16/100,147, filed on Aug. 9, 2018, now Pat. No. 10,567,412, which is a
(Continued)

(51) Int. Cl.
*H04L 29/06* (2006.01)
*G06F 21/55* (2013.01)
*G06F 16/2458* (2019.01)

(52) U.S. Cl.
CPC ........ *H04L 63/1425* (2013.01); *G06F 21/552* (2013.01); *H04L 63/1408* (2013.01);
(Continued)

(58) Field of Classification Search
CPC ............. H04L 63/1425; H04L 63/1408; H04L 63/1416; G06F 21/552
See application file for complete search history.

(56) References Cited

U.S. PATENT DOCUMENTS 9,215,240 B2   12/2015  Merza et al.
9,516,046 B2   12/2016  Merza et al.
(Continued)

OTHER PUBLICATIONS

Advisory Action dated Sep. 18, 2017 for U.S. Appl. No. 15/339,955 of Merza et al. filed Nov. 1, 2016.
(Continued)

*Primary Examiner* — Oleg Korsak
(74) *Attorney, Agent, or Firm* — Perkins Coie LLP

(57) ABSTRACT

A metric value is determined for each event in a set of events that characterizes a computational communication or object. For example, a metric value could include a length of a URL or agent string in the event. A subset criterion is generated, such that metric values within the subset are relatively separated from a population's center (e.g., within a distribution tail). Application of the criterion to metric values produces a subset. A representation of the subset is presented in an interactive dashboard. The representation can include unique values in the subset and counts of corresponding event occurrences. Clients can select particular elements in the representation to cause more detail to be presented with respect to individual events corresponding to specific values in the subset. Thus, clients can use their knowledge system operations and observance of value frequencies and underlying events to identify anomalous metric values and potential security threats.

30 Claims, 24 Drawing Sheets

Related U.S. Application Data continuation of application No. 15/339,955, filed on Nov. 1, 2016, now Pat. No. 10,091,227, which is a continuation of application No. 14/929,321, filed on Oct. 31, 2015, now Pat. No. 9,516,046, which is a continuation of application No. 13/956,252, filed on Jul. 31, 2013, now Pat. No. 9,215,240.

(60) Provisional application No. 61/858,497, filed on Jul. 25, 2013.

(52) U.S. Cl.
CPC ...... *H04L 63/1416* (2013.01); *G06F 16/2477* (2019.01); *G06F 2221/2151* (2013.01)

(56) References Cited

U.S. PATENT DOCUMENTS

| | | |
|---|---|---|
| 2002/0049838 A1 | 4/2002 | Sylor et al. |
| 2004/0254919 A1 | 12/2004 | Giuseppini |
| 2007/0100834 A1 | 5/2007 | Landry et al. |
| 2007/0250931 A1 | 10/2007 | Takahashi |
| 2008/0081959 A1 | 4/2008 | Jung et al. |
| 2011/0099500 A1 | 4/2011 | Smith et al. |
| 2011/0276396 A1 | 11/2011 | Rathod |
| 2012/0036117 A1 | 2/2012 | Zwicky et al. |
| 2012/0137367 A1 | 5/2012 | Dupont et al. |
| 2012/0173710 A1 | 7/2012 | Rodriguez |
| 2013/0326620 A1 | 12/2013 | Merza et al. |
| 2013/0332478 A1 | 12/2013 | Bornea et al. |
| 2016/0057162 A1 | 2/2016 | Merza et al. |

OTHER PUBLICATIONS

Final Office Action dated Mar. 5, 2014 for U.S. Appl. No. 13/956,252 of Merza et al., filed Jul. 31, 2013.
Final Office Action dated Sep. 4, 2014 for U.S. Appl. No. 13/956,252 of Merza et al., filed Jul. 31, 2013.
Final Office Action dated Jun. 23, 2016 for U.S. Appl. No. 14/929,321 of Merza et al., filed Oct. 31, 2015.
Final Office Action dated Jul. 3, 2017 for U.S. Appl. No. 15/339,955 of Merza et al. filed Nov. 1, 2016.
Final Office Action dated May 1, 2018 for U.S. Appl. No. 15/339,955 of Merza et al. filed Nov. 1, 2016.
Non-Final Office Action dated Oct. 25, 2013, for U.S. Appl. No. 13/956,252, filed Jul. 31, 2013.
Non-Final Office Action dated May 28, 2014 for U.S. Appl. No. 13/956,252 of Merza et al., filed Jul. 31, 2013.
Non-Final Office Action dated Mar. 30, 2016 for U.S. Appl. No. 14/929,321 of Merza et al., filed Oct. 31, 2015.
Non-Final Office Action dated Mar. 21, 2017 for U.S. Appl. No. 15/339,955 of Merza et al. filed Nov. 1, 2016.
Non-Final Office Action dated Nov. 29, 2017 for U.S. Appl. No. 15/339,955 of Merza et al. filed Nov. 1, 2016.
Notice of Allowance dated Sep. 21, 2015 for U.S. Appl. No. 13/956,252 of Merza et al., filed Jul. 31, 2013.
Notice of Allowance dated Sep. 14, 2016 for U.S. Appl. No. 14/929,321 of Merza et al., filed Oct. 31, 2015.
Notice of Allowance dated May 18, 2018 for U.S. Appl. No. 15/339,955 of Merza et al., filed Nov. 1, 2016.
Notice of Allowance dated Nov. 22, 2019 for U.S. Appl. No. 16/100,147 of Merza et al., filed Aug. 9, 2018.
Non-Final Office Action dated Oct. 16, 2019 for U.S. Appl. No. 16/100,147 of Merza et al., filed Aug. 9, 2018.
Carasso, David , "Exploring Splunk—Search Processing Language (SPL) Primer and Cookbook", Apr. 2012, 156 Pages.
Han, Jiawei et al., "Data Mining: Concepts and Techniques", 2nd ed., Chapter 10, 58 pages.
Warren, Rik et al., "Use of Mahalanobis Distance for Detecting Outliers and Outlier Clusters in Markedly Non-Normal Data: A Vehicular Traffic Example", Air Force Research Laboratory 711th Human Performance Wing, Human Effectiveness Directorate, Wright-Patterson Air Force Base, OH, 60 pages.

| < prev ☐ 2 next>> http_user_agent ⬥ | filter ⬥ | sparkline ⬥ | length ⬥ | count ⬥ | z ⬥ | lastTime ⬥ |
|---|---|---|---|---|---|---|
| mozilla/4.0 (compatible; msie 6.0; windows nt 5.1; sv1; .net clr 2.0.50727; infopath.1; ms-rtc lm 8; .net clr 1.1.4322; .net clr 3.0.4506.2152; .net clr 3.5.30729) | | ⌇⌇ | 163 | 4 | 19.05 | 04/24/2013 13:20:00 |
| mozilla/4.0 (compatible; msie 8.0; windows nt 5.1; trident/4.0; .net clr 1.1.4322; .net clr 2.0.50727; infopath.1; .net clr 3.0.4506.2152; .net clr 3.5.30729) | | ⌇⌇ | 158 | 3 | 18.40 | 04/24/2013 13:20:00 |
| mozilla/4.0 (compatible; msie 6.0; windows nt 5.1; sv1; funwebproducts; .net clr 2.0.50727; infopath.1; ms-rtc lm 8) | | ⌇⌇ | 116 | 1 | 12.98 | 04/24/2013 11:15:00 |
| mozilla/4.0 (compatible; msie 6.0; windows nt 5.1; sv1; maxthon; .net clr 2.0.50727; infopath.1; clb o) | | ⌇⌇ | 102 | 2 | 11.17 | 04/24/2013 13:20:00 |
| jakarta commons-httpclient/3.0.1 | | ⌇⌇ | 32 | 4 | 2.13 | 04/24/2013 13:20:00 |
| superbot/4.4.0.60 (windows xp) | | ⌇⌇ | 30 | 7 | 1.87 | 04/24/2013 13:20:00 |
| microsoft bits/6.6 | | ⌇⌇ | 18 | 2 | 0.33 | 04/24/2013 12:20:00 |
| microsoft bits/6.7 | | ⌇⌇ | 18 | 4 | 0.33 | 04/24/2013 13:20:00 |
| shockwave flash | | ⌇⌇ | 15 | 2910 | -0.06 | 04/24/2013 14:00:00 |
| java/1.4.2_08 | | ⌇⌇ | 13 | 3 | -0.32 | 04/24/2013 13:20:00 |

View full results

FIG. 8B

| < prev [1] 2 next>> | | | | | | |
|---|---|---|---|---|---|---|
| firstTime ⊕ | lastTime ⊕ | src ⊕ | bytes ⊕ | count ⊕ | z ⊕ | filter ⊕ |
| 04/23/2013 21:18:42 | 04/23/2013 21:18:42 | 10.11.36.39 | 1932371 | 1 | 3.04 | |
| 04/24/2013 06:19:34 | 04/24/2013 12:18:18 | 10.11.36.40 | min: 1667348 avg: 1799924 max: 1932500 | 2 | 2.80 | |
| 04/24/2013 05:15:32 | 04/24/2013 05:15:32 | 10.11.36.50 | 1715903 | 1 | 2.84 | |
| 04/23/2013 18:20:38 | 04/23/2013 18:20:38 | 10.11.36.35 | 1665884 | 1 | 2.58 | |
| 04/23/2013 18:22:24 | 04/24/2013 09:21:44 | 10.11.36.11 | min: 1667348 avg: 1540620 max: 1741882 | 2 | 2.32 | |
| 04/23/2013 16:17:23 | 04/23/2013 16:17:28 | 10.11.36.32 | 1442580 | 1 | 2.12 | |
| 04/23/2013 22:18:44 | 04/23/2013 22:18:44 | 10.11.36.20 | 1293713 | 1 | 1.84 | |
| 04/23/2013 21:18:11 | 04/23/2013 21:18:11 | 10.11.36.38 | 1268318 | 1 | 1.79 | |
| 04/24/2013 06:22:08 | 04/23/2013 13:20:54 | 10.11.36.15 | min: 932214 avg: 1253034 max: 1573854 | 2 | 1.77 | |
| 04/23/2013 22:20:12 | 04/23/2013 22:20:12 | 10.11.36.8 | 1111629 | 1 | 1.50 | |

| lastTime ⊕ | action ⊕ | src ⊕ | dest ⊕ | transport ⊕ | dest_port ⊕ | bytes ⊕ | count ⊕ |
|---|---|---|---|---|---|---|---|
| 04/24/2013 09:21:44 | allowed | 10.11.36.11 | 10.11.36.16 | udp | 53 | 1357358 | 1 |
| 04/23/2013 16:22:24 | allowed | 10.11.36.11 | 10.11.36.40 | tcp | 9997 | 1741882 | 1 |

View full results

FIG. 18B

DETECTION OF POTENTIAL SECURITY THREATS IN MACHINE DATA BASED ON PATTERN DETECTION

CROSS-REFERENCE TO RELATED APPLICATIONS

This application is a continuation of U.S. application Ser. No. 16/100,147, filed on Aug. 9, 2018, which is a continuation of U.S. application Ser. No. 15/339,955, filed on Nov. 1, 2016, now U.S. Pat. No. 10,091,227, issued on Oct. 2, 2018, which is a continuation of U.S. application Ser. No. 14/929,321, filed on Oct. 31, 2015, now U.S. Pat. No. 9,516,046, issued on Dec. 6, 2016, which is a continuation of U.S. application Ser. No. 13/956,252, filed on Jul. 31, 2013, now U.S. Pat. No. 9,215,240, issued on Dec. 15, 2015, which claims the benefit of U.S. provisional application No. 61/858,497, filed on Jul. 25, 2013, each of which is incorporated by reference herein.

TECHNICAL FIELD

The present disclosure relates generally to computer-implemented systems and methods for determining metric values based on electronic data, generating objects that identify outlier metric values that may be indicative of a security issue, and allowing users to dynamically investigate the number and detail of events corresponding to particular values of interest.

BACKGROUND

Electronic communications across networks are becoming pronounced features in the business and personal worlds. However, such communication also exposed systems to security threats. Hackers are developing increasingly sophisticated techniques for infiltrating computational systems in gaining access to confidential information. For a given technique, a rule can often be developed to prevent execution of the technique.

Frequently, though, hackers can recognize the developed rule and adjust the technique. Further, it can be difficult to identify a rule that positively targets actual threats yet allows desirable or internal functions to continue to operate appropriately. Therefore, many computational systems continue to remain exposed to security threats, and improved security techniques are needed to provide computational security.

SUMMARY

In accordance with the teachings provided herein, systems and methods are provided for determining and evaluating a metric value from each electronic event in a set of events. The events can include those characterizing a computer action and/or communication (sent or received over a network). Thus, e.g., examples of metrics can include a length of a URL or user agent string in an event, a traffic size noted in an event, or an HTTP category of a URL in an event. A visual object (e.g., a table or graph) is generated for client inspection that includes information pertaining to all metric values in the set or a subset thereof (those located in one or both tails of a distribution of the values). For example, an object can represent all metric values that are more than one standard deviation from a mean calculated based on a set of events occurring within a particular time period. Frequently, for subset-based analyses, each metric value in a set of metric values is analyzed in view of a population characteristic to determine whether to include a representation of the value in the object.

Inputs corresponding to client identification of thresholds or variables can be received and used to define a subset criterion. The identification can be, e.g., that of a Z-score, a threshold distance from a center of a distribution of metric values in a population, or a threshold distance from a mean or median of a metric-value population. A subset can then be generated to include all metric values for which the criterion is satisfied for the metric, and the object can represent metric values in the subset. Thus, a client can thereby influence how many metric values are represented in the object (e.g., by adjusting a Z-score input).

In one instance, the object shows all unique metric values for which the criterion is satisfied, and—for each unique value—how many events correspond to that metric value. This can enable a client to detect suspicious data, such as metric values with counts suspiciously high compared to similar other metric values. An input corresponding to a selection of a metric value in the subset can be received, and the object can be dynamically changed to show increasing detail of the event data underlying the representation of the metric value. For example, all or part of the actual events corresponding to the value can be listed and/or a time object can be generated that shows when events corresponding to the value occurred within a time period.

In some embodiments, a computer-implemented method is provided. A set of events is accessed. Each event in the set of events characterizes a computational action or computational communication. A set of metrics is determined. Each metric in the set of metrics is determined based on a corresponding event in the set of events. A population characterization is generated based on the extracted metrics. An input is received that corresponds to an identification of a criterion to use to identify metrics to include in a subset of the set of metrics. For each event in the set of events, the extracted metric is analyzed with respect to the population characterization. For each event in the set of events, a determination is made as to whether the criterion is satisfied based on the analysis. A subset of metrics is generated that consists of all metrics for which the criterion is satisfied. A presentation that includes the subset of metrics is generated.

Also provided, in some embodiments, is a system including one or more data processors; and a non-transitory computer readable storage medium containing instructions which when executed on the one or more data processors, cause the one or more processors to perform the method. Further provided, in some embodiments, is computer-program product tangibly embodied in anon-transitory machine-readable storage medium, including instructions configured to cause one or more data processors to perform the method.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The present disclosure is described in conjunction with the appended figures:

FIG. 8B shows an example of a table object showing unique metric values and corresponding event counts;

FIG. 18B shows an expanded table with details for specific traffic events contributing to a summarized traffic event shown in the table from FIG. 18A;

Like reference numbers and designations in the various drawings indicate like elements.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
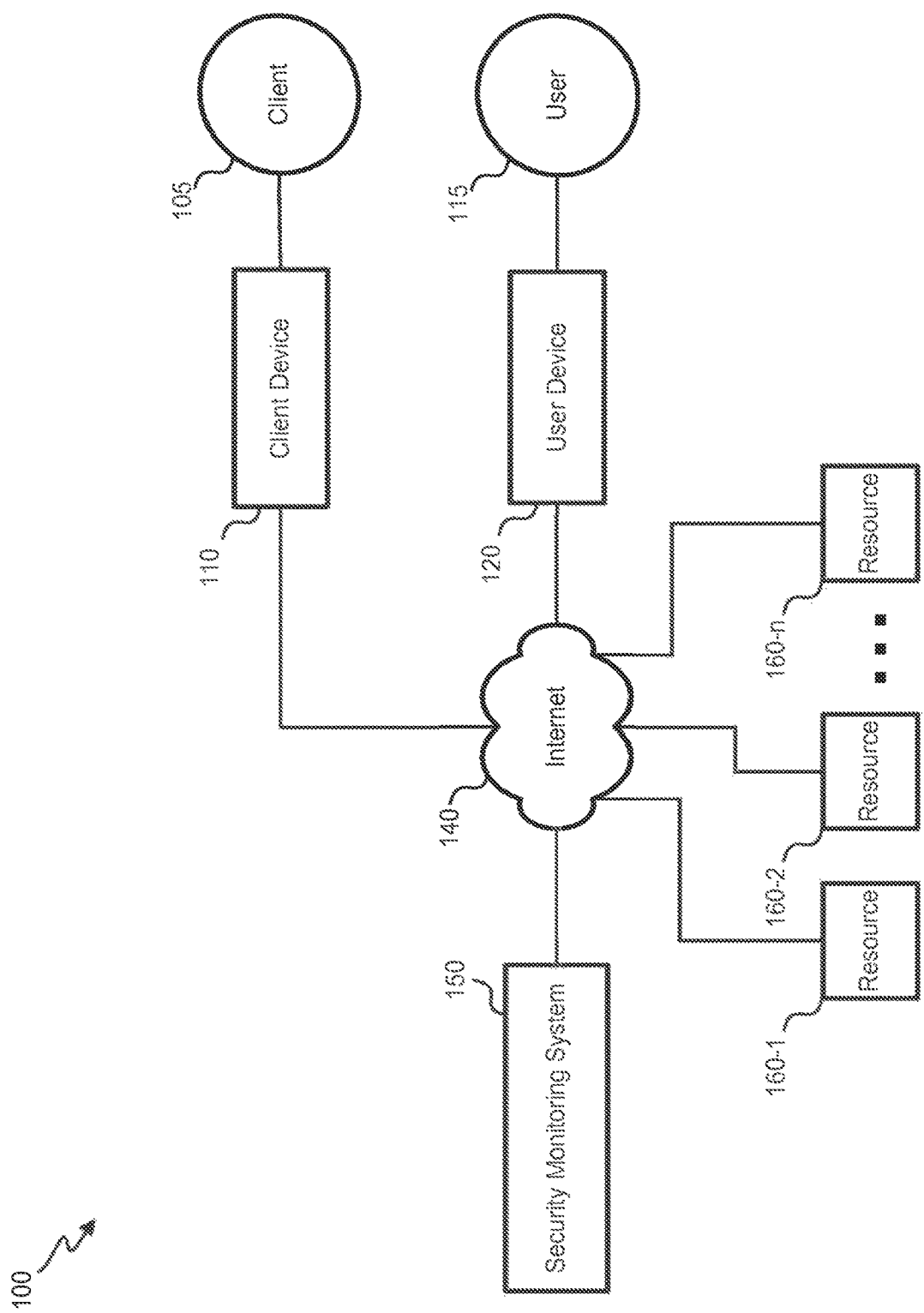
FIG. 1 shows a block diagram of an embodiment of a security-monitoring interaction system.

Referring first to FIG. 1, a block diagram of an embodiment of a security monitoring interaction system 100 is shown. A client 105 and/or user 115 can interact with a security monitoring system 150 via respective devices 110 and/or 120 and a network 140, such as the Internet, a wide area network (WAN), local area network (LAN) or other backbone. It will be understood that, although only one client 105 and user 115 are shown, system 100 can include multiple clients 105 and/or users 115.

Client device 110 and/or user device 120 can each be a single electronic device, such as a hand-held electronic device (e.g., a smartphone). It will be understood that client device 110 and/or user device 120 can also include a system that includes multiple devices and/or components. The device(s) 110 and/or 120 can comprise a computer, such as the desktop computer, a laptop computer or a tablet. In some instances, a party 105 and/or 115 uses different devices at different times to interact with security monitoring system 150.

Security monitoring system 150 provides client 105 with tools to access indicators of potential security threats. Specifically, security monitoring system 150 can collect data from one or more resources 160, process the data (e.g., internally and/or using one or more resources) to identify events in the data (e.g., webpage requests or logs), and determine metric values from the events. A resource from which data is collected can include, e.g., a server, a router and/or a user device 120. The events can pertain to activity initiated by a user 115 and/or activity performed on or via user device 120. In some instances, client 105 maintains, controls and/or operates a network system that supports online activity of user 115. Security monitoring system 150 then compares individual metric values to a population characteristic (e.g., a mean, median, standard deviation, median of absolute deviation or distribution property) built from a set of metric values. Metric values sufficiently distinct from the population characterization are presented to client 105. The presentation can include, for each metric value, a number of events corresponding to the value and timestamps of those events. Thus, a client will be able to see if a large number of atypical metric values are beginning to arise.

As detailed further below, client 105 can interact security monitoring system 150 to dynamically specify a metric of interest, a time period of interest, a level of detail pertaining to underlying events of interest, and a variable influencing a criterion used to determine which metric values are sufficiently distinct from the population characterization to present. Therefore, client 105 can use its own experience and knowledge to investigate what he believes are the most concerning metric values.

Figure 2:
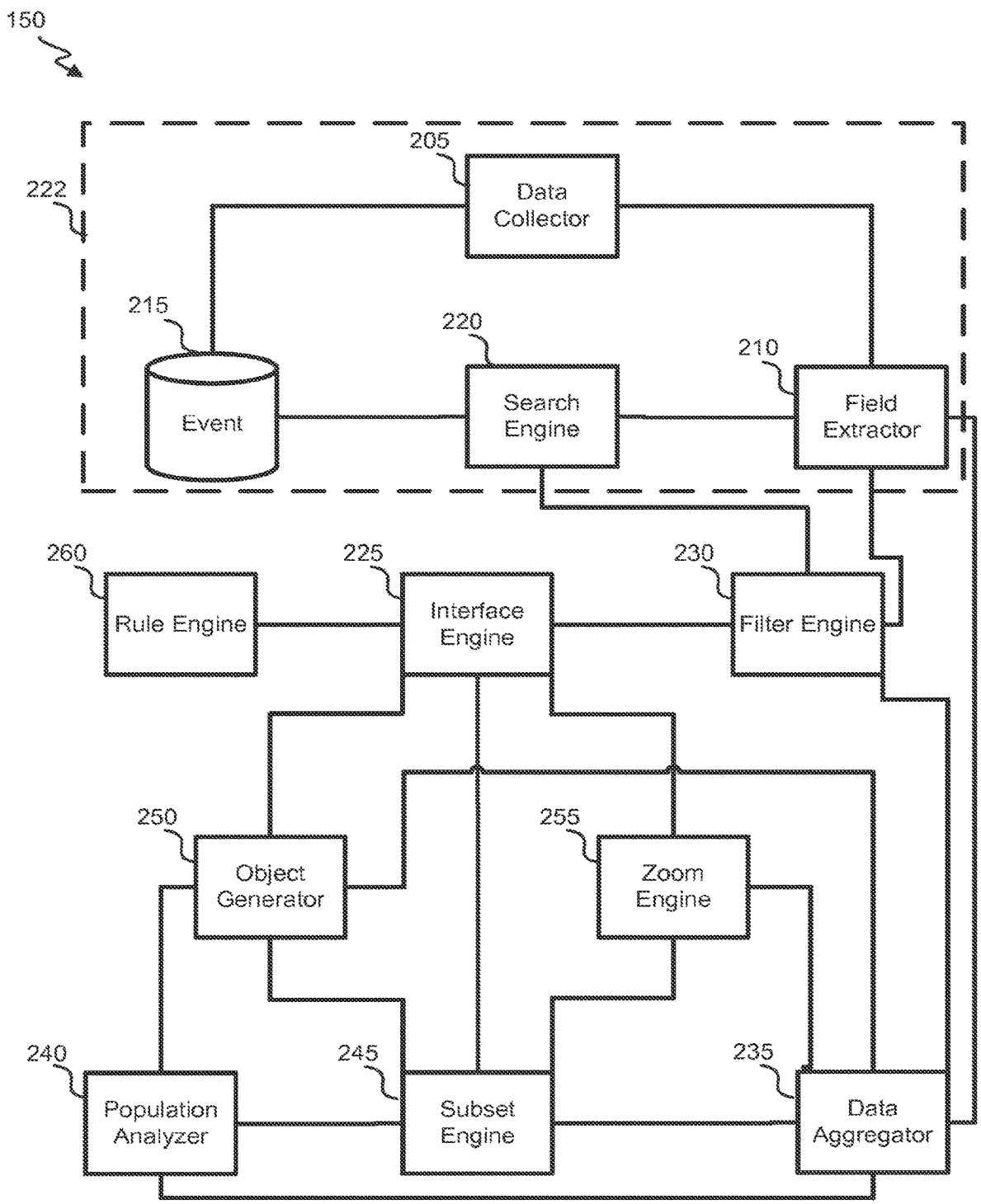
FIG. 2 shows a block diagram of an embodiment of security monitoring system.

Referring next to FIG. 2, a block diagram of an embodiment of security monitoring system 150 is shown. Security monitoring system 150 can be, in part or in its entirety, in a cloud. In some instances, at least part of security monitoring system 150 is present on a device, such as a client device 110. In some instances, various components in security monitoring system 150 are present in one or more resources. For example, event data store 315 can be stored on resource 160-1, and interface engine 225 can operate on resource 160-2. Thus, security monitoring system 150 can include a distributed system.

A data collector 205 collects data from one or more resources 160. The data can include unstructured data, structured data and/or machine data. The data can include data from web logs and/or can pertain to web access. Discrete events can be present within the data. These events can include HTTP requests and/or traffic logs. As will be described in further detail herein, the collected data can be segmented into the events and particular values can then be extracted from the events.

Initially, and as further detailed below, a field extractor 210 extracts a timestamp from each event. Based on the timestamp, data collector 205 stores each event in an appropriate index in an event data store 215.

A search engine 220 can then retrieve select events pertinent to a particular analysis at hand. For example, a particular time period can be identified based on, e.g., input originating from a client and received via an interface engine 225. Events with timestamps within the time period can then be retrieved by search engine 220 from event data store 215. Data collector 205, field extractor 210, event data store 215 and search engine 220 can be part of a data management system 222, described in further detail in reference to FIG. 3 below.

An additional retrieval variable can be determined based on a type of metric to be analyzed or a type of client to whom data will be presented. For example, for a particular department in a company, a client may only be interested in or authorized to examine metrics pertaining to web traffic. A filter engine 230 can then generate a filter indicating which types of events to retrieve (e.g., log files and HTTP requests). As another example, a client may only be authorized to view events pertaining to actions from select users (e.g., users within a client's company). Filter engine 230 can then generate a filter appropriately, which may involve specifying a field value identifying an organization (e.g., employer) or a list of user-device identifiers.

A data aggregator 235 identifies which value is to be extracted from the retrieved events. The identification can be made based on a metric of interest. In some instances, the extracted value is itself a value for the metric. In some instances, the extracted value is processed to determine the value for the metric (e.g., to determine a length or number of bytes of the extracted value or to determine whether the extracted value matches a comparison value).

Examples of values extracted from the events and pertaining to the metric of interest include: a user agent string, a URL, a traffic size, and a URL category. Other values not used to determine a value for the metric can also be extracted from events by field extractor 210. For example, a timestamp can be extracted to indicate when particular metric values occurred, an IP address can be extracted to indicate where events with particular metric values originated, etc.

The metric of interest can be one identified by a corresponding input received via interface engine 225. The metric of interest can include one with values that have the potential to support detection of security of threats. The metric of interest can include a length of a user agent string, a length of a URL string, a detection as to whether a user agent string or URL includes a particular substring, a traffic size, a detection as to whether a user agent string, URL or URL category matches a particular value, or a number of URL categories.

Following the data aggregator's determination as to which values are to be extracted from events, field extractor 210 extracts the appropriate values and returns them to data aggregator 235. Data aggregator 235 performs any requisite processing on the values (e.g., to identify a string length or determine whether the value matches one or more particular stored values).

In some instances, more events are retrieved by search engine 220 than are to be used for a particular analysis. For example, all web access events within a particular time period are retrieved, and then only a subset having a particular HTTP method value (e.g., "GET" or "POST") are further analyzed. In such situations, filter engine 230 can generate (which can include retrieving) a filter that can isolate events that are to contribute to the analysis. Data aggregator 235 can then apply the filter, such that each event in a set of events remaining after the filter application is to be included in the analysis. In one instance, the filter is applied by analyzing values in the data structure (e.g., indicating an HTTP method type). In one instance, data aggregator 235 requests that field extractor 210 return to the retrieved events and extract the pertinent value.

Data aggregator 235 can then generate a data structure that includes an element for each event in a set of events, each element identifying a metric value and a corresponding event identifier. The metric values in the data structure make up a set of metric values that corresponds to the set of events. The data structure can further include, in each element, other pertinent values, such as an event's timestamp.

The events pertaining to a particular analysis can be clustered into a set of events. A corresponding set of metrics can include, for each event in a set of events, a value for a metric of interest.

Data aggregator 235 sends the metric values to a population analyzer 240. In some instances, population analyzer 240 generates a distribution based on the metric values and determines a type of the distribution. This determination can involve determining whether the distribution qualifies as a normal distribution, which can include applying a normality test, attempting to fit the distribution to a Gaussian, assessing a goodness of a fit to a Gaussian, and/or computing a likelihood that the metric values came from a normal distribution (e.g., using Bayesian statistics). Population analyzer 240 can operate to condition subsequent analysis on the metric values if specific distribution characteristics are not present (e.g., if the distribution is not normal) but allow the analysis to continue otherwise. In some instances, the distribution assessment is performed on a different set or supra-set of metric values, which can include metric values not contributing to a current analysis. For example, a previous analysis may have shown that values of URL length are normally distributed, and population analyzer 240 can then allow future analyses on URL-length metric values to proceed independent of any evaluation of a distribution of a particular set of those metric values.

When the distribution is sufficient to allow for the analysis to proceed or when no distribution pre-assessment is performed, population analyzer 240 determines a population characterization based on the values. The determination can include calculating a statistic and/or generating a distribution. Frequently, the population characterization will include a single value or a set of values. Examples of population characterizations include a mean, median, standard deviation, median of absolute deviation and distribution property. Examples of distribution properties include a metric value at which n % of the population is below the value, a metric value at which n % of the population is below the value, a percentage of metric values falling within a particular range, a percentage of metric values falling above (or below) a particular value, an amplitude, an offset, or a width (or standard deviation).

A subset engine 245 then receives the set of metric values from data aggregator 235 and one or more population characterization from population analyzer 240. Subset engine 245 further identifies a subset criterion. The criterion can be set to identify individual metric values in one or both tails of the distribution. Their separation from the distribution center may suggest that they correspond to suspicious events. Thus, subset engine 245 can analyze each expected metric with respect to a population characterization. Based on the analysis, subset engine 245 can determine whether the criterion is satisfied. For example, subset engine 245 can determine a distance separating each metric value from a population mean. A subset criterion can identify a threshold separation distance, such that values giving rise to separation distances greater than the threshold are to be included in a subset. The threshold can be a fixed number or can include another population characterization, such as a standard deviation of the population or a multiple thereof.

A subset criterion can be identified based on input corresponding to an identification of a subset variable selected by a client. For example, a client may select a threshold Z score, such that values with larger Z scores are to be included in a subset. As another example, a client may select a threshold separation distance or order statistic.

In some instances, subset engine 245 generates a second data structure that includes only data pertaining to events giving rise to metric values in the subset. Alternatively, a subset engine 245 marks entries in the initial data structure that gave rise to metric values in the subset. Subset engine 245 can identify all of the unique metric values in the subset and can determine how many events represented in the subset correspond to each unique metric value. For example, if a subset of metrics values included the following contents: 10, 10, 10, 30, 50, 60, 60, 80 and 100, unique values would be 10, 30, 50, 60, 80 and 100, and the corresponding count would be 3, 1, 1, 2, 1 and 1. Subset engine 245 would then generate a third data structure, for which each element (e.g., row) includes a unique value, a count of events for the value, and identifiers of the events corresponding to the value.

An object generator 250 can receive a data structure for the subset and generate an object representing the subset. The object can be a visual representation of data; for example, the object can include a table, chart, graph or figure. The object may identify one or more of: the metric values within the subset and/or a count of events corresponding to each metric value in the subset. The object can further include information about events corresponding to each unique metric value, such as a number of source IP addresses; a minimum, mean, median or maximum timestamp. The object can further identify a separation of each metric value from a population characterization (e.g., a median, mean or extremum).

The object can include one or more population characterizations, which can include a characterization used to define the subset and/or another characterization (e.g., a maximum or minimum value in the entire set of metrics; a range of the values in the set of metrics; a total number of events in the set or subset; and/or a total of the values in the set of metrics, a maximum, minimum or average count across all metric values). In some instances, the population characterization relates only to the metric values in the subset, rather than the entire set. The object can identify part or all of the applied subset criterion (e.g., a variable set based on input) or applied filter.

An object can include, e.g., a table, text, figure or other graphic. In one instance, a scatter plot includes points based on metric values and counts. In one instance, a table includes rows, each representing a unique metric value. Each row can include the value, a count, a separation from a population characterization and temporal information (e.g., a last corresponding timestamp, or a sparkline showing when timestamps for events corresponding to the metric value occurred).

The object can be interactive, allowing a client to click on object elements (e.g., points in a scatter plot, bars in a histogram, or rows or values in a table). Clicking on a particular element can cause more detail to be shown pertaining to events contributing to the element. In another instance, a client can click on more general zoom elements, thereby indicating a request to enhance or mitigate a level of detail. In some instances, the interaction can indicate a request for data not currently available to object generator 250. In these instances, interface engine 225 can alert zoom engine 255 of the interaction. Zoom engine 255 can then communicate with appropriate elements of security monitoring system 150 (e.g., data aggregator 235, subset engine 245 and population analyzer 240 (not shown)) to aggregate and analyze the appropriate data, and the object can be appropriately updated. This interactive approach can allow a client to investigate metric values that he believes to be most concerning. If detailed analysis reveals that his intuition is incorrect, he can easily navigate to a higher-level view to investigate any other interesting data points.

Thus, security monitoring system 150 can avoid the application of rigid and fixed rules to generate security-threat alerts or to block behavior and instead relies on client evaluation and experience to identify actually concerning metric values. This can be particularly advantageous in the security field, where security threats repeatedly evolve in technique and style.

Once a client determines that a metric value is concerning, he can cause his client device to interact with interface engine 225 to respond to a presence of the metric value in future events in a desired way. For example, "GET" HTTP requests with user agent strings of an identified length can be ignored or denied. Operational function can also be restricted for user devices associated with events having the identified concerning metric values. Interface engine 225 can present the option to initiate a rule, receive relevant input (e.g., corresponding to an identification of a concerning metric value and a consequence), and relay the input to a rule engine 260. Rule engine 260 can then generate the rule. Rule engine 260 can cause real-time events to be monitored for a presence of the metric value and, upon detection of the metric value, execute the rule.

Security monitoring system 150 can perform data collection and analyze and object updating in real-time (e.g., a "last 24-hour period") or for a static time window (e.g., "Jul. 10, 2013"). For a real-time situation, an object presented can change as new data is collected.

Figure 3:
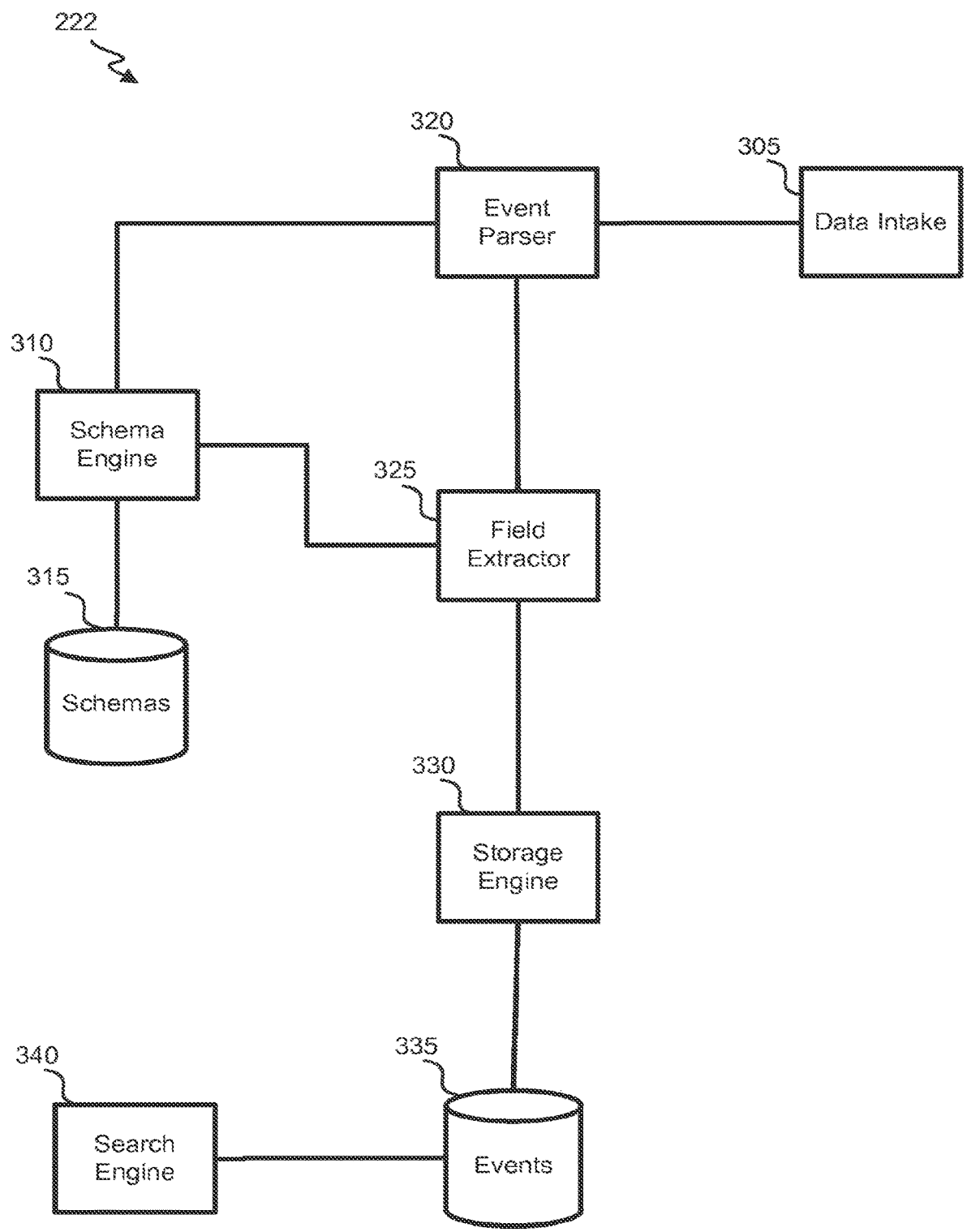
FIG. 3 shows a block diagram of an embodiment of a data management system.

FIG. 3 shows a block diagram of an embodiment of a data management system 222. Data intake 305 receives data, e.g., from a data provider, client, or user. The data can include automatically collected data, data uploaded by users, or data provided by the data provider directly. In some instances, the data includes a structure that allows for individual events and field values within the events to be easily identified. The structure can be predefined and/or identified within the data. For example, various strings or characters can separate and/or identify fields. As another example, field values can be arranged within a multi-dimensional structure, such as a table. In some instances, data partly or completely lacks an explicit structure. For example, in some instances, no structure for the data is present when the data is received and instead is generated later. The data may include a continuous data stream and can include multiple events, each with multiple field values.

A schema engine 310 identifies an applicable schema that can be used to extract specific field values by imposing structure on data. Specifically, a schema can be "bound" to data, by breaking a data stream (e.g., a byte stream) into events and/or extracting field values, such as a time stamp. Schema binding can occur while receiving data, prior to storing data, while storing data, while processing data, while retrieving data, while responding to a search query or some combination of the above (e.g., separating data into events at intake and extracting field values from events while responding to a search query). Late binding schema can be used, which imposes structure on the data at query time rather than at storage or ingestion time.

Schema engine 410 can itself estimate a schema or can determine a schema based on input from a client or data provider. The input can include the entire schema or restrictions or identifications that can be used to estimate or determine a full schema. Such input can be received to identify a schema for use either with structured or unstructured data and can be used to reliably extract field values. The schema can be estimated based on patterns in the data (e.g., patterns of characters or breaks in the data) or headers or tags identifying various fields in the data, such as <event><message time>2014.01.05.06.59.59</> . . . </>). Schema can be received or estimated in a variety of times, including (in some instances) any time between receipt or indexing of the data and a query time. The time that the schema is actually received or estimated within the receipt-to-indexing time period may be determined based on a setting or system load. Schema engine 410 can perform the schema estimation once or multiple times (e.g., continuously or at routine intervals). Once a schema is determined, it can be modified (e.g., periodically, at regular times or intervals, upon receiving modification-requesting input, upon detecting anew or changed pattern in the input, or upon detecting suspicious extracted field values (e.g., being of an inconsistent data type, such as strings instead of previously extracted integers)). In some instances, a client or data provider can provide input indicating a satisfaction with or correction to estimated schema. Received or estimated schemas are stored in a schema data store 415.

Using the schema, an event parser 320 can separate the received data into events. For example, event parser 320 can separate data between particular start and stop tags, or separate data within a table's row, or separate data within particular character numbers in the data. Also using the schema, a field extractor 325 can extract various field values. In some instances, field extractor 325 further attaches a semantic meaning to the extracted field values (e.g., based on a length and/or character types of the field values). Field extractor 325 can further convert field values into a particular (e.g., standard or easily searchable) format.

It is noted that data collector 205 from system 200 can largely parallel the combination of data intake 305 and event parser 320. While system 200 does not explicitly show schema engine 310 and schema data store 315, it will be appreciated that system 200 can include these elements, which can then be utilized by data collector 205 and field extractor 210.

A storage engine 330 can store data in an event data store 335, which can correspond to event data store 215. It will be appreciated that event data store 335 can include multiple data stores or sub-data stores. Event data store 335 can be stored in working, short-term and/or long-term memory. In various instances, event data store 335 can include raw data, extracted events or extracted field values. It will be appreciated that, in some instances, part of the data received by data intake 305 can be deleted or not stored (e.g., field breaks).

Events and/or field values can be stored at locations based on a field value. For example, a field value identifying a message sender may be stored in one of ten data stores, the data store being chosen based on a message time. In some instances, rather than grouping various data components at specific storage areas, event data store 435 includes an index that tracks identifiers of events and/or fields and identifiers of field values. Thus, for example, the index can include an element for "Data type="webpage request" (indicating that the element refers to a field value of "webpage request" for the field "data type") and then list identifiers for events with the field value (e.g., "Events 3, 7, 9 and 16"). Selective storage grouping can be referred to as storing data in "buckets". Bucket definitions can be fixed or defined based on input from a data provider, client or user. Input and/or automatic rules can be used to add, merge or delete buckets.

In some instances, a time-series data store is used, such that events and/or field values are stored at locations based on a timestamp extracted from the events. This can allow events with recent timestamps (e.g., which may have a higher likelihood of being accessed) to be stored at preferable memory locations that lend to quicker subsequent retrieval. Further, parallel processing can then be performed, with each process operating on a different time bucket.

A search engine 340 (which can correspond to search engine 220) can subsequently access and search all or part of event data store. The search can be performed upon receiving a search query from a client, user or client, or the search can be performed periodically and/or at defined intervals or times. Segregation of data into events and/or fields can allow for more efficient searching. The search may include, e.g., a request to return all events or identifiers of all events having a value for a field meeting a criterion. To illustrate, search engine 340 can retrieve all events having a timestamp within a defined time period, or all events having a first field value (e.g., HTTP method) set to a specified value (e.g., GET).

The search may include, e.g., a request to return values for one or more first fields for all events having specified values (e.g., specific values or values within a specific range) for one or more second fields. To illustrate, search engine 340 can retrieve all URLs in events having a timestamp within a defined time period, or all events having a first field value (e.g., HTTP method) set to a specified value (e.g., GET).

In some instances, upon retrieving the event data of interest, search engine 340 may further process the results. The processing may be performed based on an individual value (e.g., to obtain a length or determine if an extracted field value matches a specified value). In some instances, processing can be performed across values, e.g., to determine an average, frequency, count or other statistic. Search engine 340 can return the search result to a data provider, client or user, e.g., via an interface (such as a web interface or app interface) or email.

Figure 4:
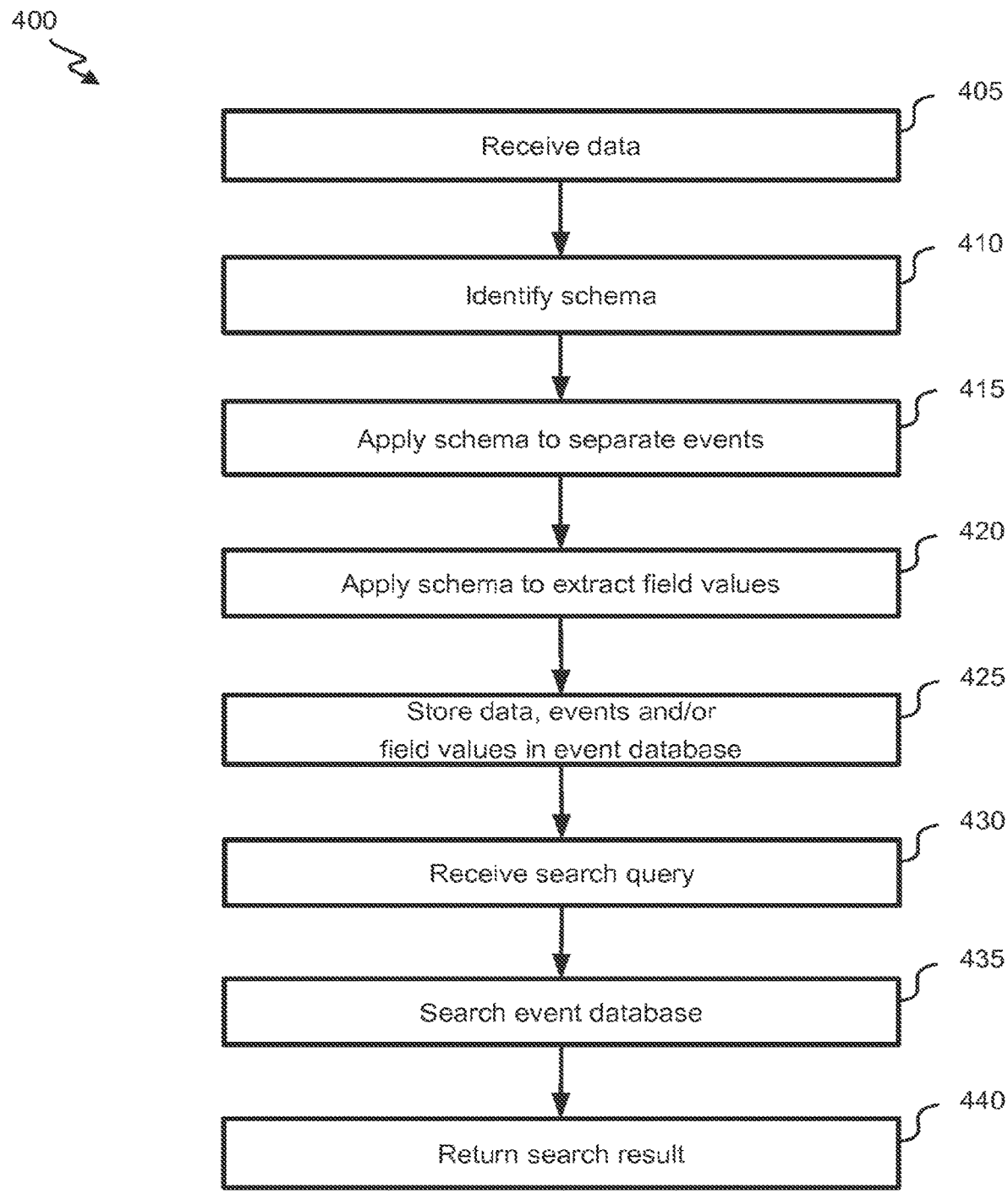
FIG. 4 illustrates a flowchart of an embodiment of a process for storing and using big data.

FIG. 4 illustrates a flowchart of an embodiment of a process 400 for storing and using big data. Process 400 begins at block 405, where data intake 305 receives data. Schema engine 310 identifies an applicable schema at block 410. Event parser 320 applies the schema to separate the data into events at block 415. Field extractor 325 applies the schema to extract field values from the events at block 420. Storage engine 330 stores raw data, events and/or field values in event data store 335 (e.g., by assigning the data, events and/or field values to buckets based on particular field values) at block 425.

Search engine 340 receives a search query from a searcher (e.g., client or user) at block 430. The search query can include one or more criteria which can specify or constrain field values. Search engine 340 searches event data store 335 at block 435. The search can entail searching only some of event data store 335 (e.g., that include field values of interest). The search can produce identifiers of events of interest. Search engine 340 may then collect other field values for those events of interest. A search result can include the collected other field values and/or a processed version thereof. Search engine 340 returns the search result to the searcher at block 340.

It will be appreciated that system 222 and/or process 400 can be modified such that schema is not bound to data (or only a portion of the schema is bound to data) immediately following intake. For example, schema could instead be bound prior to or during storage of the data or at a query time (e.g., subsequent to block 430 of process 400).

Data management system 222 and/or process 400 can be modified to include features, feature connections and/or flows as described in Carasso, David, *Exploring Splunk Search Processing Language (SPL) Primer and Cookbook*, New York: CITO Research, 2012 and/or as described in Ledion Bitincka, Archana Ganapathi, Stephen Sorkin, and Steve Zhang, *Optimizing data analysis with a semi-structured time series database*, In SLAML, 2010. Each of these references is hereby incorporated by reference in its entirety for all purposes.

Figure 5:
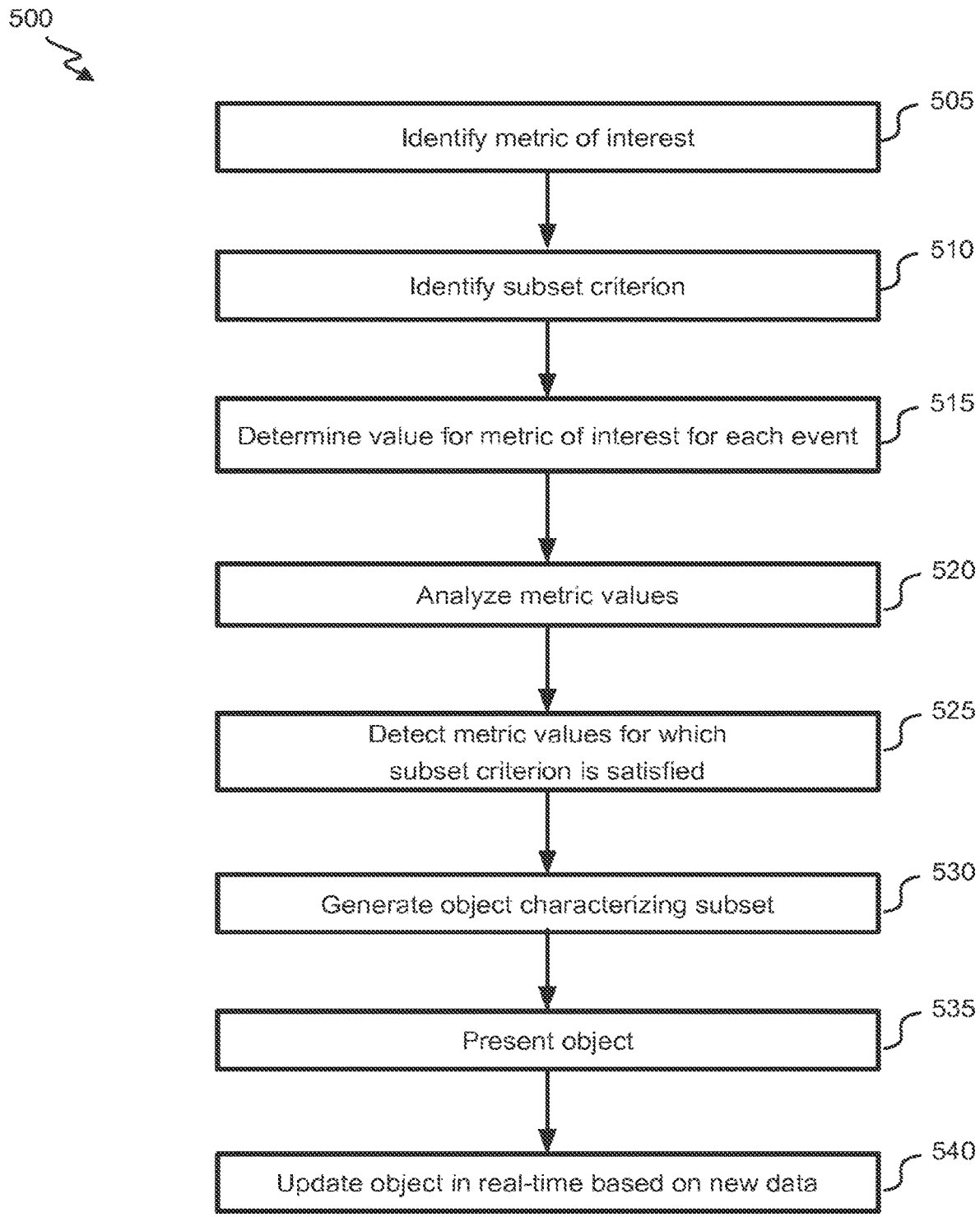
FIG. 5 illustrates a flowchart of an embodiment of a process for generating an object to characterize select events for which a subset criterion is satisfied.

FIG. 5 illustrates a flowchart of an embodiment of a process 500 generating an object to characterize select events for which a subset criterion is satisfied. Process 500 begins at block 505, where data aggregator 235 identifies, from each event in a set of retrieved events, a metric of interest. The events can include those retrieved from event data store 215 and/or events from data received in real-time. The metric of interest can include a fixed metric routinely assessed by security monitoring system 200. In some instances, the metric of interest is determined based on input corresponding to an identification of the metric. For example, the input can include a name for metric, a selection from a list of options of metrics, or a definition for the metric (e.g., indicating where a value for the metric is within events).

Subset engine 245 identifies a subset criterion at block 510. The subset criterion can be fixed, can be determined based on input corresponding to an identification of a variable to include in the criterion, or can be determined based on input corresponding to a definition of the criterion. For example, the input can correspond to an identification of a separation distance from a numerically fixed (e.g., "30"), statistically fixed (e.g., "2 standard deviations" or "2 Z-scores"), or relatively fixed (e.g., "45%") population characterization (e.g., from a mean). The input can also identify a direction. For example, a client may only be interested in viewing information pertaining to metric values greater than a population characterization. Using such input, subset engine 245 can then integrate the defined variables into a base criterion (e.g., subset defined to include event data for all events having a metric value greater than 1 standard deviation plus the mean).

Data aggregator 235 determines a value for the metric of interest for each retrieved event at block 515. In some instances, the value of the metric of interest is the same as a value extracted by field extractor 210 from events. In some instances, data aggregator 235 processes the extracted value to derive the value of the metric of interest (e.g., by determining a byte length of the extracted value).

Subset engine 245 analyzes the metric values at block 520. As described in further detail below, the analysis can include comparing the metric value to a population characterization. For example, subset engine 245 may determine a difference between a mean for a population of an extremum. As another example, subset engine 245 may determine what percentage of other metric values in the population are below the given metric value.

Based on the analysis, subset engine 245 detects metric values for which the subset criterion is satisfied at block 525. Subset engine 245 can then define one or more subsets accordingly. Specifically, a subset of events can include all events in the set of events giving rise to a metric value for which the subset criterion was satisfied (and not other events in the set), and a subset of metric values can include only the metric values for which the subset criterion was satisfied. Thus, the subset of events can include fewer events than the set of events.

Object generator 250 generates an object characterizing the subset at block 530. For example, the object can include metric values in the subset of metric values, the number of events giving rise to each metric value in the subset of metric values, a number of total events represented in the subset, a population characterization and/or the subset criterion.

Interface engine 225 presents the object at block 535. The presentation can be an interactive presentation, such that a client can focus on particular metric values, change a level of detail, and/or change analyzed time period or metric of interest.

In some instances, the data represented in the object is static until a client initiates a change. In process 500, however, interface engine 225 updates the object in real-time based on new data from user devices at block 540. Block 540 can thus include routinely receiving appropriate events in real-time, and then repeating blocks 515-535. In some instances, old data is also or alternatively removed from the representation in the object. In these real-time instances, it will be appreciated that the population characterization may also be changing in real-time, due to a change in which events are included in a given moment's set of events. Thus, even if a same event is represented in a set of events at two distinct moments and if a same subset criterion is applied for both moments, it may be included in a subset at one of the moments and not the other.

Figure 6:
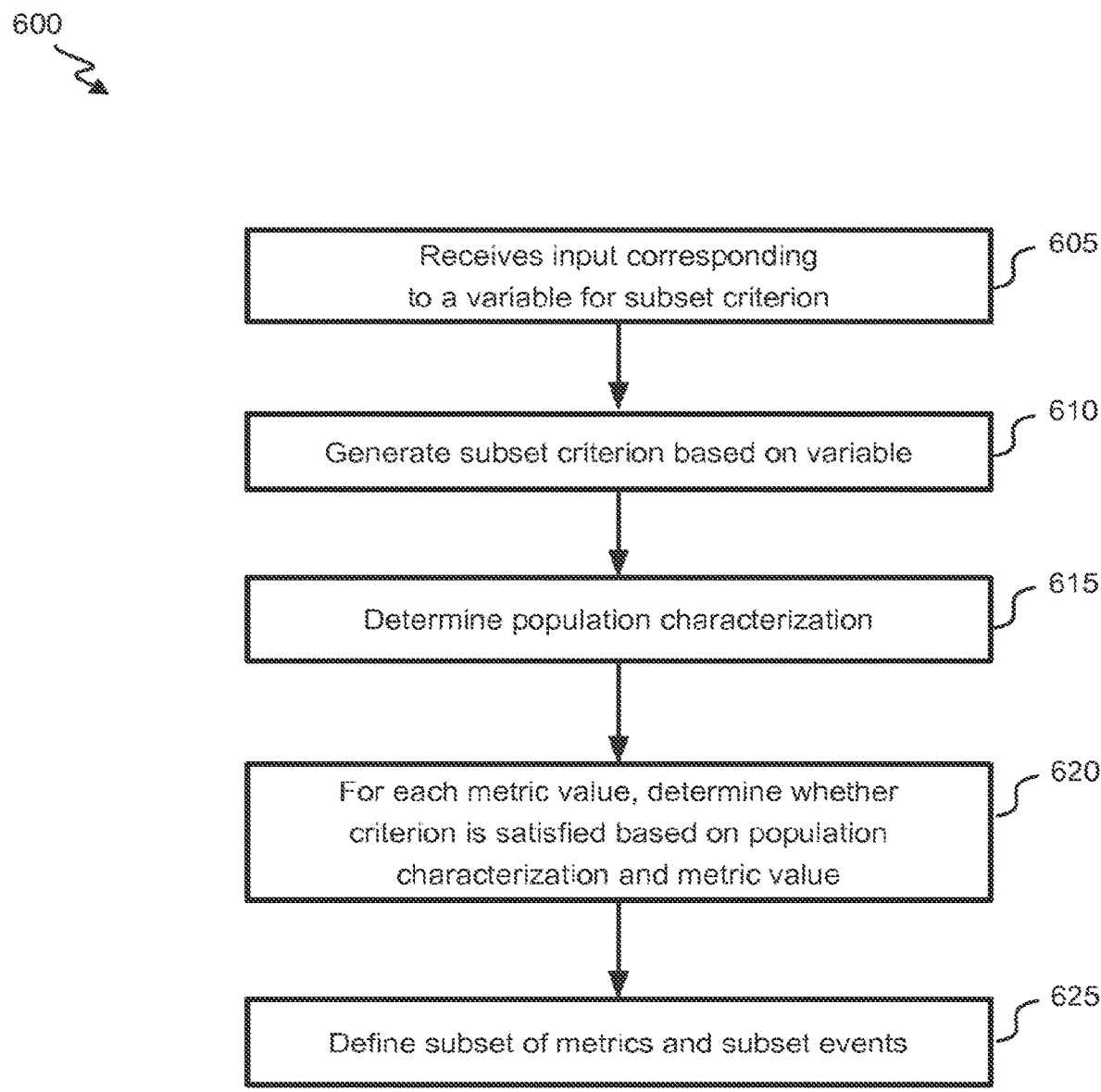
FIG. 6 illustrates a flowchart of an embodiment of a process for defining a subset of metrics.

FIG. 6 illustrates a flowchart of an embodiment of a process 600 for defining a subset of metrics. Process 600 begins at block 605, where subset engine 245 receives input corresponding to a variable in the subset. Subset engine 245 generates a subset criterion based on the variable at block 610.

Population analyzer 240 determines a population characterization at block 615. The population characterization can be determined based on a set of metric values derived from a corresponding set of events pertaining to a present security analysis. For each metric value in the set of metric values, subset engine 245 determines whether the criterion is satisfied based on population characterization and metric value at block 620. At block 625, subset engine 245 defines a subset of metrics as those for which the subset criterion is satisfied.

Figure 7:
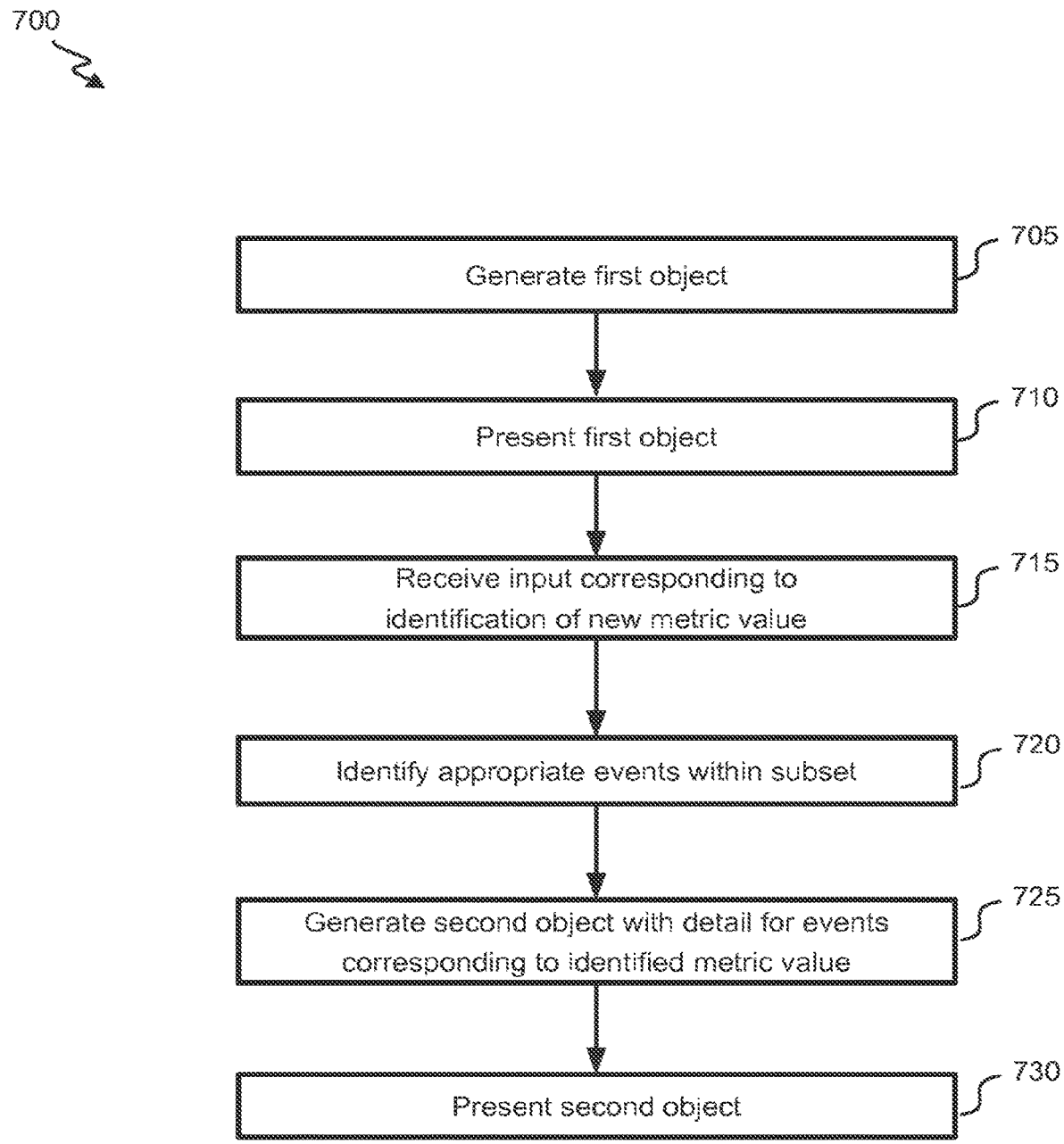
FIG. 7 illustrates a flowchart of an embodiment of a process for zooming into events corresponding to a specific metric value.

FIG. 7 illustrates a flowchart of an embodiment of a process 700 for zooming into events corresponding to a specific metric value. Process 700 begins at block 705, where object generator 250 generates a first object. The first object can include a representation of metric values within a subset of metric values. For example, the first object can identify unique metric values within the subset of metric values and, in some instances, a count of the number of events corresponding to each represented metric value.

Figure 8A:
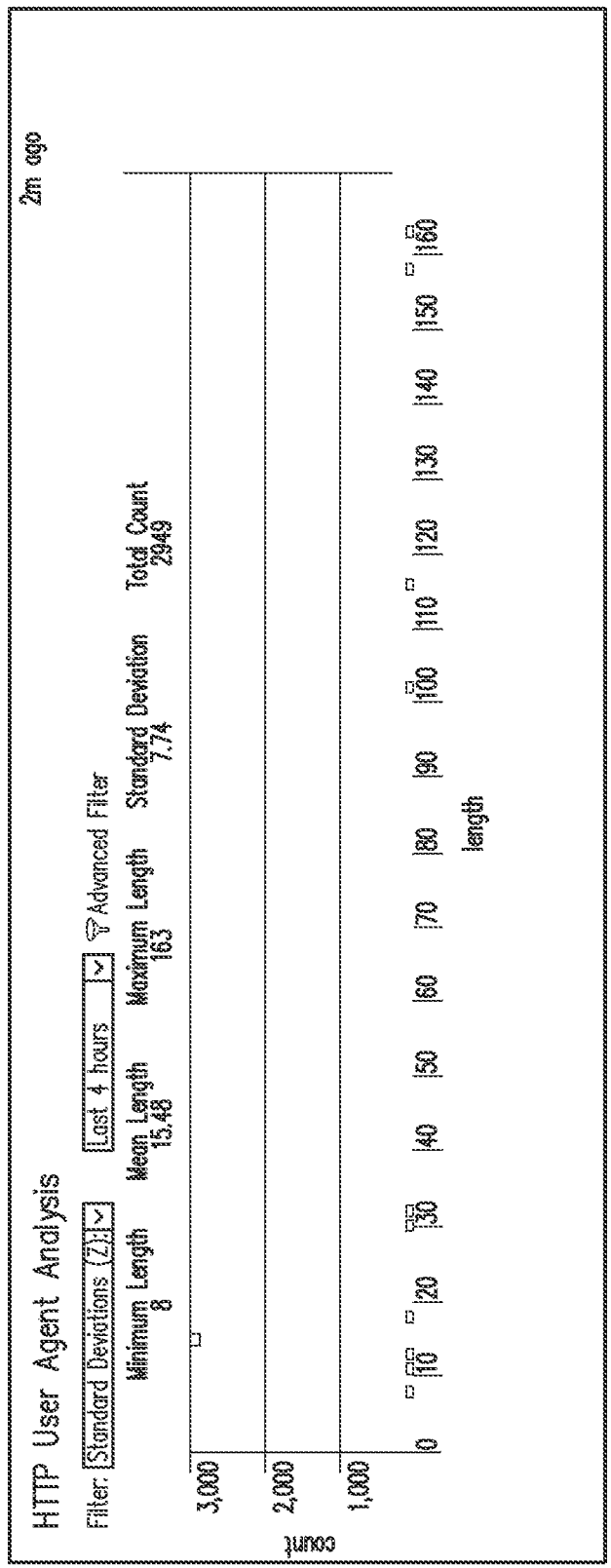
FIG. 8A shows an example of a scatter-plot object showing unique metric values and corresponding event counts.

FIG. 8A shows an example of a first object that includes a scatter plot. Here, the x-axis represents a metric value, which in this case, is a length of an HTTP user agent string. The y-axis shows the number of events within the subset (which is equivalent to the number of events within the set) that correspond to the metric value. This figure shows population statistics that can be presented. In this particular instance, no subset variable has yet been received, so all events in the set of events are represented. However, the client can select a subset variable by pulling down the filter menu and selecting a Z-score. Metric values with Z-scores less than the selected Z-score will then be removed from the object.

FIG. 8B shows an example of a first object that includes a table. Here, each row corresponds to a unique user agent string. The row lists each string. Further, a sparkline shows a histogram of timestamps (within a given time window) for events corresponding to the identified string. The table further indicates how long each string was, how many times within the window that it was observed, and the last time that it was observed. Because, in this instance, the metric is no string itself but instead is the length of the string, the table also shows the Z score for each string. It will be appreciated that the objects in FIGS. 8A and 8B may be shown together or separately, or only one may be presented.

Interface engine 225 presents the first object via an investigative dashboard at block 710. The investigative dashboard is interactive, such that a client can drill down into particular representations to understand the event data underlying the representation.

Interface engine 225 receives input corresponding to an identification of metric value via investigative dashboard at block 715. For example, a client may click on a point in a scatter plot, row in a table, or bar in a histogram, each of which corresponds to a metric value (which may be shown numerically or graphically in the first object).

Figure 8C:
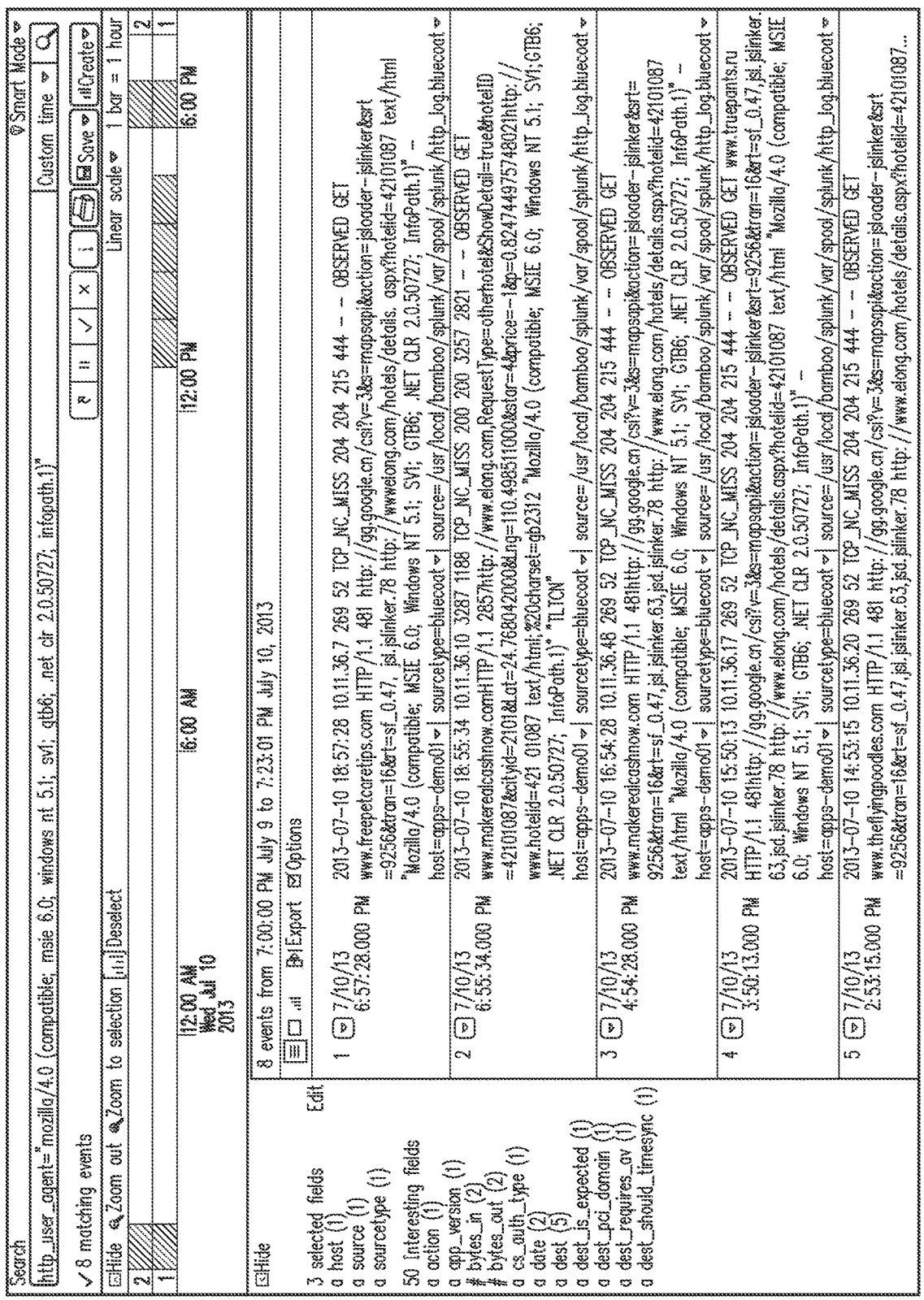
FIG. 8C shows an example of a second object representing events corresponding to a particular metric value.

Data aggregator 235 identifies events from the subset of events that correspond to the identified metric value at block 720. Object generator 250 generates a second object (which may include modifying the first object) to include detail for events corresponding to the identified metric value at block 725. FIG. 8C shows an example of a second object representing events corresponding to a particular metric value. The top of the object includes a histogram showing, at various time points within the analyzed time period, how many events corresponded to the identified metric value. The object then continues to list the actual events corresponding to the identified metric value. The client can then assess whether they pose a security threat. Interface engine 225 presents second object via the investigative dashboard at block 730.

Figure 9:
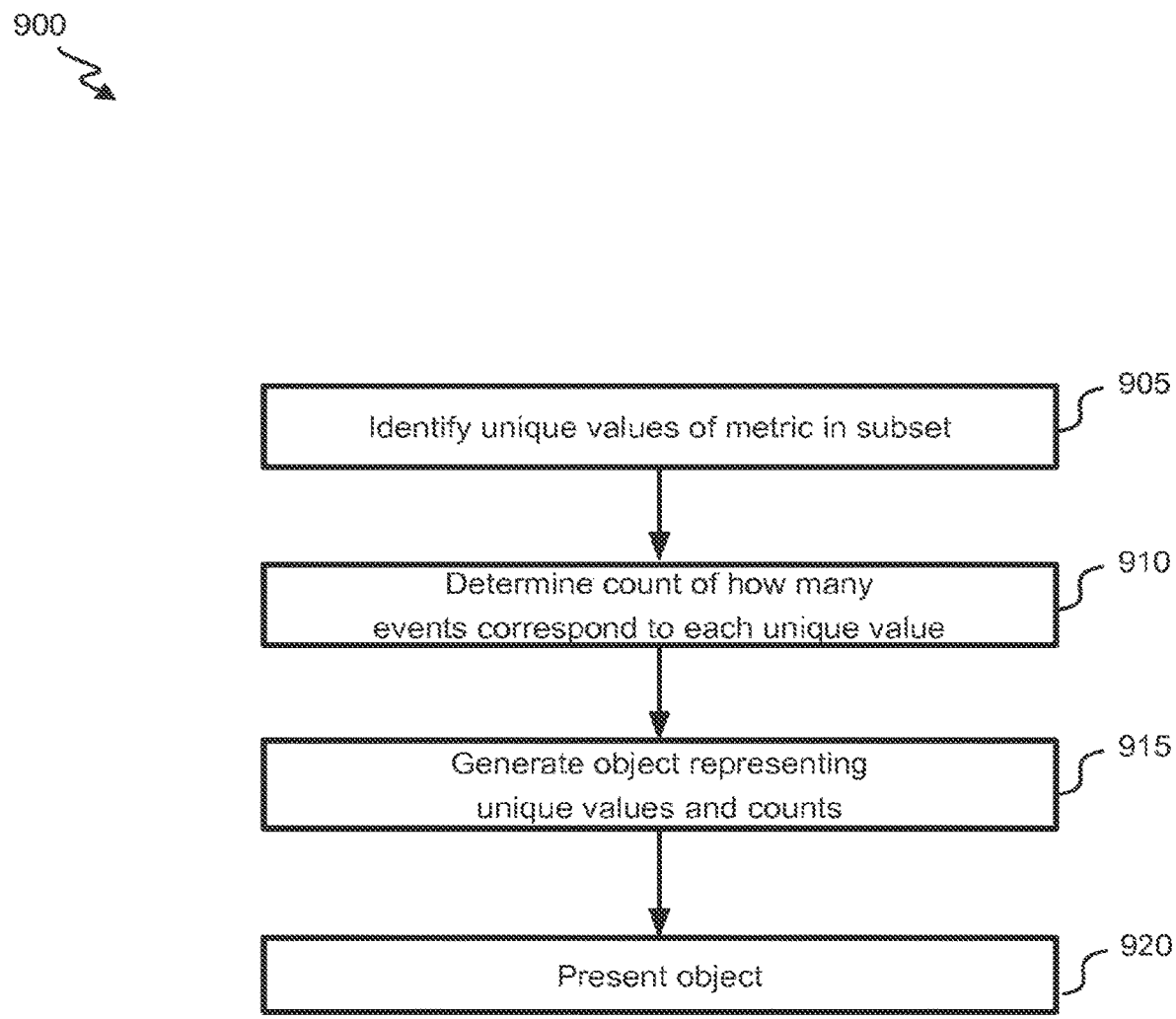
FIG. 9 illustrates a flowchart of an embodiment of a process for collapsing metric information for presentation simplicity.

FIG. 9 illustrates a flowchart of an embodiment of a process 900 for collapsing metric information for presentation simplicity. Process 900 begins at block 905, where subset engine 245 identifies unique values of the metric in the subset of metric values. The unique values are such that the unique values include no duplicates but include every number from the subset of metric values.

Subset engine 245 determines a count of how many events correspond to each unique value at block 910. Thus, if the subset of metrics included the metric value "10" three times, a count corresponding to that metric value would be three.

Object generator 250 generates an object including an indication of unique values and the corresponding counts at block 915. Examples of such objects are shown in FIGS. 8A and 8B. Notably, the objects do not merely list the metric value for each event in the subset of events (or in this case, the set of events, since no subset criterion is yet defined), but rather, the representation is condensed to instead convey this information using unique values and counts.

Interface engine 225 presents the object via an investigative dashboard at block 920. The client can then zoom in on particular metric values of interest to understand the underlying events.

Figure 10:
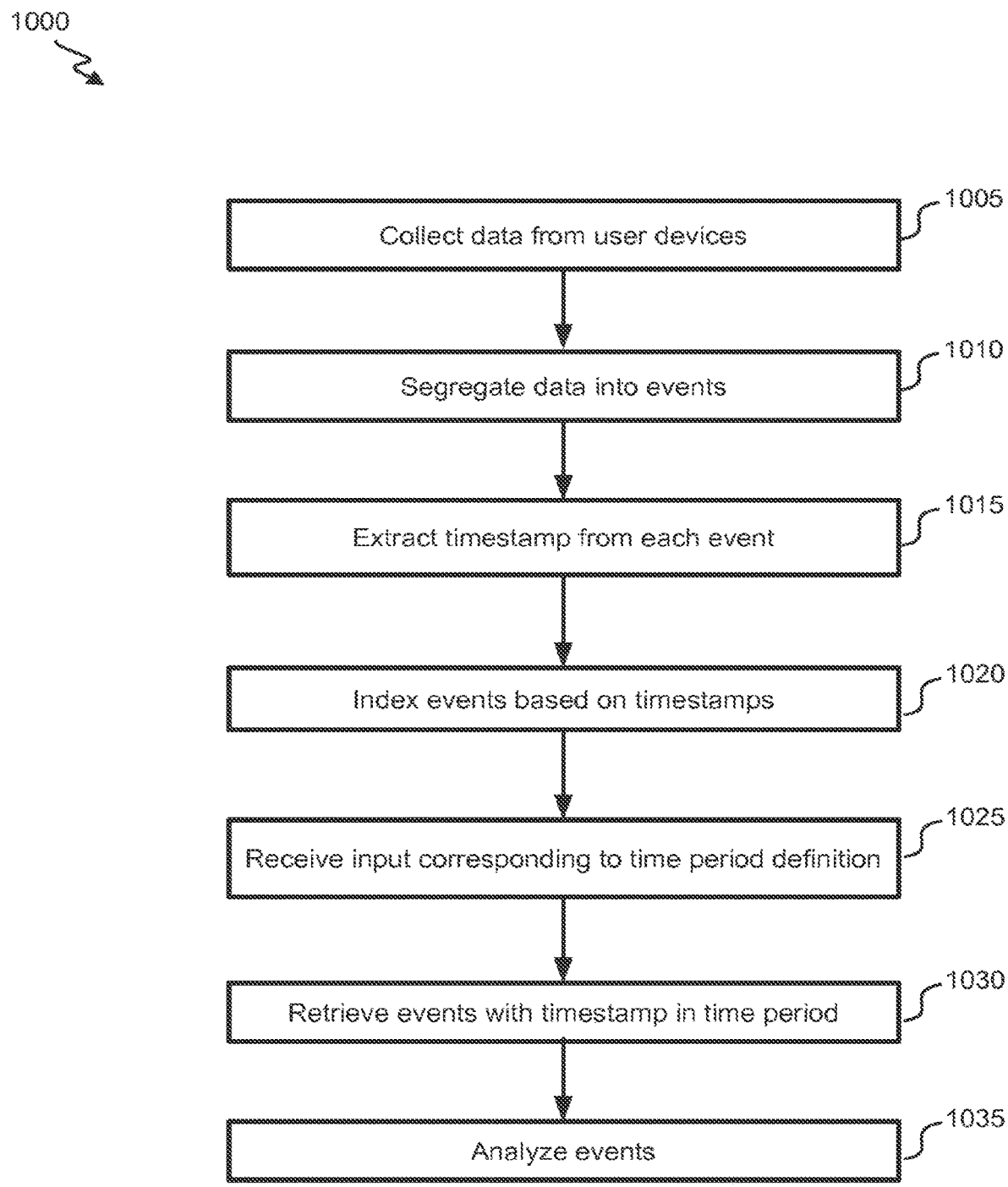
FIG. 10 illustrates a flowchart of an embodiment of a process for retrieving events for metric analysis based on dynamically identified time periods and event indexing.

FIG. 10 illustrates a flowchart of an embodiment of a process 1000 for retrieving events for metric analysis based on dynamically identified time periods and event indexing. Process 1000 begins at block 1005, where data collector 205 and/or data intake 305 collects data from user devices. This can include receiving a stream (e.g., an unstructured stream) of data from a server or router.

Data collector 205 and/or event parser 320 segregate the data into events at block 1010. This segregation can be performed based on application of a schema, as described herein. Each event can correspond to an action taken by, a communication sent by, or a communication received by a computer (which can include a computational system) or server.

Field extractor 210/325 extracts a timestamp from each event at block 1015. Data collector 210 and/or storage engine 330 indexes events in event data store 215 based on timestamps at block 1020.

Interface engine 225 receives first input corresponding to a definition of a time period at block 1025. For example, FIG. 8A illustrated an example of a pull-down menu which can be used by a client to select a time period of interest. In some instances, the time period is independent of input and can correspond to a fixed absolute time period or a fixed relative time period (e.g., last 24 hours). Search engine 220/340 retrieves events from event data store 215 that have timestamps in time period. This retrieval may be aided by storing events in a time-indexed manner.

Field extractor 210/320, data aggregator 235, population analyzer 240 and/or subset engine 245 then analyze the events. Thus, due to the initial time indexing and the storage of complete events, clients will have the ability to even access old data and dynamically deciding which metrics are of interest, rather than having to predefine the metric and/or be confined to recent data assessments.

Figure 11:
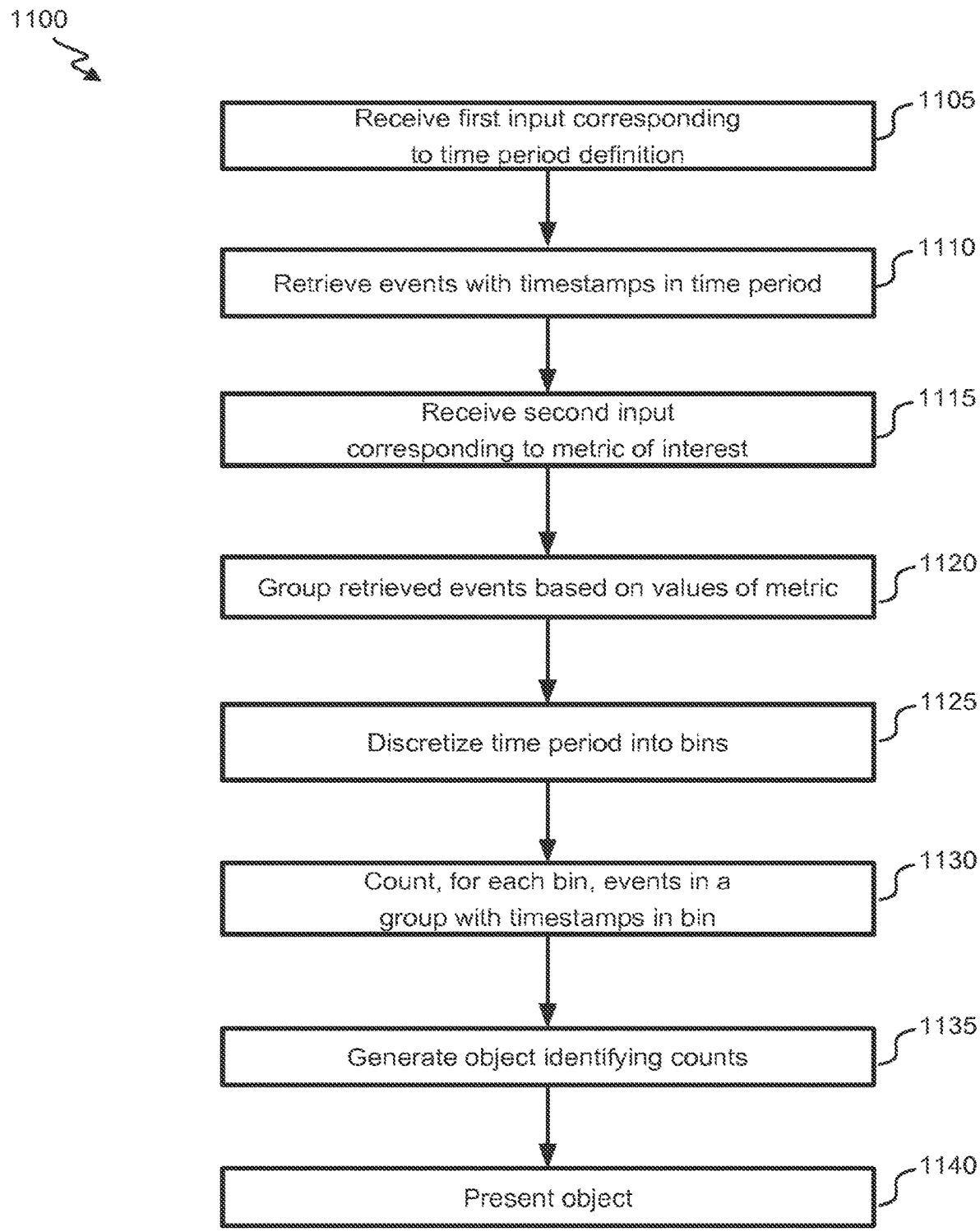
FIG. 11 illustrates a flowchart of an embodiment of a process for representing events corresponding to a specific metric value.

FIG. 11 illustrates a flowchart of an embodiment of a process 1100 for representing events corresponding to a specific metric value. Process 1100 begins at block 1105, where interface engine 225 receives a first input corresponding to a definition of a time period Search engine 220/340 retrieves events with timestamps in time period at block 1110. In some instances, the events are indexed in a time-dependent manner such that retrieving the appropriate events from the time-period point amounts to merely turning to the appropriate indices in the event data store 215. In a related instance, search engine 220/340 may search for events but may only do so within indices corresponding to time definitions relevant given the time period. In some instances, search engine 220/340 searches for events with appropriate time stamps (across some or all indices in event data store 215). The events may be stored in association with their time stamps, so as not to have to repeat the extraction of the timestamps.

Interface engine 225 receives a second input corresponding to a metric of interest at block 1115. Data aggregator 235 groups retrieved events based on values of metric of interest at block 1120. For example, each group can correspond to a unique value.

Subset engine 245 discretizes the time period into bins at block 1125. The discretization can be performed to ensure that there are a specific number of bins (or bins within a specified range) within the time period or that the bins are of a specified duration (or a duration within a specified range). In some instances, bin durations are also chosen in an effort to try to avoid subsampling so much as to substantially decrease the probability that one bin will correspond to multiple events. For example, a 24-hour time period may be discretized into 24 1-hour bins, and a 1-hour time period may be discretized into 12 5-minute bins. Both the number and duration of bins are different but the selection may be fine enough to allow a client to understand temporal variability within the window, but also to easily see temporal clustering (which may be represented by a single bin).

For given group of retrieved events, subset engine 245 counts a number of events in the group having timestamps in each bin in the time window at block 1130. Object generator 250 generates an object identifying the counts of identified events with time stamp in each bin at block 1135. For example, FIG. 8B shows sparklines amounting to line graphs of the count versus the bin times, and FIG. 8C shows a histogram of this information. Interface engine 225 presents the object via an investigative dashboard at block 1140.

Figure 12:
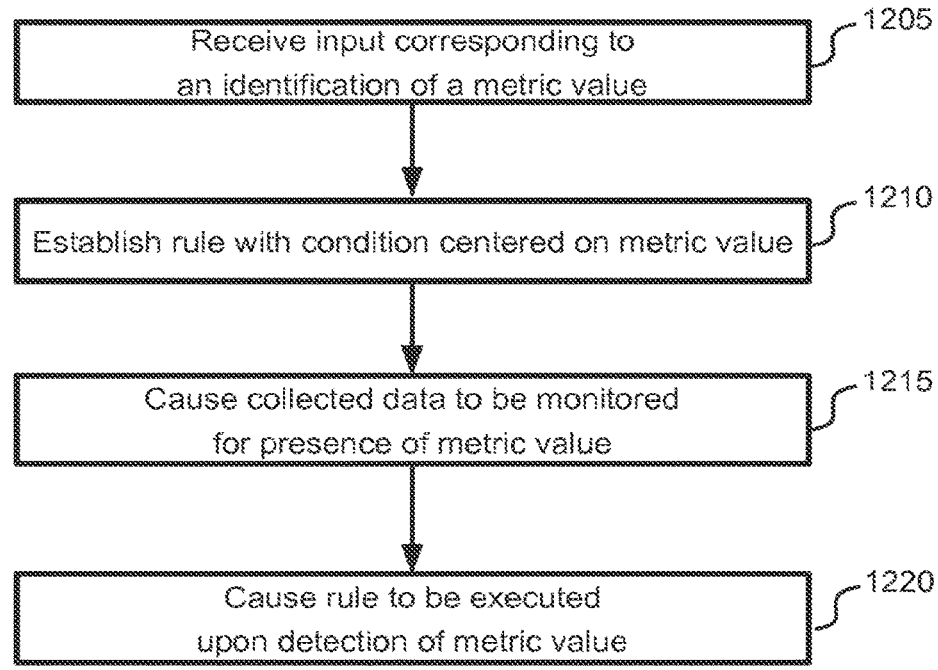
FIG. 12 illustrates a flowchart of an embodiment of a process for generating a rule based on an identification of an undesirable metric value using a security monitoring system.

FIG. 12 illustrates a flowchart of an embodiment of a process 1200 for generating a rule based on an identification of an undesirable metric value using security monitoring system 150. Process 1200 begins at block 1205, where interface engine 225 receives input corresponding to an identification of a metric value. The input may correspond to an indication that the client wishes for a rule to be established based on the metric value. For example, clicking on a point in a scatter plot or an icon in a row in a table may present the client with the opportunity to define the rule. The input may include additional information, such as whether the rule is to be invoked only upon detection of a particular value or upon a range of values, what the effect will be (e.g., triggering an alert or blocking an action), which types of events the rule is to be applied to (e.g., those pertaining to select user devices), and/or how the long the rule is to be effective (e.g., indefinitely, until revoked, for 30 days, until Aug. 24, 2014, etc.).

Rule engine 260 establishes a rule with a condition centered on the metric value at block 1210. For example, the condition may include that an event was detected that included a value corresponding to the metric value or is within a range centered on the metric value. The rule can include an effect that will occur upon detection of condition fulfillment. The effect can be fixed or defined based on the input.

Rule engine 260 causes collected data to be monitored for the presence of the metric value at block 1215. This monitoring can include real-time extraction of a field value and/or processing of the field value. The monitoring can further include comparing a raw or processed field value to a value in the condition.

Rule engine 260 also causes the rule to be executed upon detection of the metric value at block 1220. Thus, for example, upon detection of the condition fulfillment, an alert may be sent to the client (e.g., including information about the event at issue) or a user device corresponding to the event may be prohibited from completing a current action or communication or embarking a new (e.g., similar, same or any) event or communication.

Security monitoring system 150 provides clients with the opportunity to understand the significance of particular metric values. Thus, the client can then define rules strategically, so as to most effectively secure the involved network or system. The same system allows the client to easily toggle between using the system's investigative capabilities and defining strategic rules.

One example of a metric is a variable characterizing a URL length. Events can indicate webpages accessed by user devices. The accessed webpage can differ from the requested webpage. In some instances, a webpage request can be intercepted or a webpage can be deceptively represented, thereby deceiving a user as to which webpage he is visiting. For example, local malware can insert additional substrings into a URL identified by a user in a GET request or into a URL returned to the user in a POST request. Hackers can then identify confidential information entered by the user. Thus, long URLs can suggest that accessing the URL is a security threat. URL suspicion can also arise from suspicious (e.g., inconsistent, profane, uncommon or unrecognized) URL substrings. In some instances, malware will shorten URLs so as to obscure the malicious underlying of the URL. Thus, like in the user-agent string instance, a metric could count a length of a URL, a number of profanities, typos, non-technical terms or potential malware identifiers, or a metric could include an overall severity rating based on one or more of these properties (e.g., a combined total of a severity rating of each profanity, a maximum confidence in a presence of a malware identifier, etc.).

Analyses pertaining to webpage requests and retrievals can be further refined to account for whether the webpage was retrieved from or requested from a direct source by analyzing a value in a referrer field in an HTTP request. If not, a request or post was likely rerouted. Such rerouting can suggest that there is a security concern, as malware can reroute or modify requests to go through or to malicious targets. Rerouting can be detected by detecting a seemingly random string which can be inserted into a rather common URL or noticing a lack of a "referrer", as malware frequently deletes such field data. However, some redirection is not threatening and could be performed by, e.g., a host itself (e.g., rerouting a request for a ".com" site to a ".org" site). As another example, a local-system setting or software can be implemented to redirect all traffic through a blank webpage to reduce the possibility that local information (e.g., query strings or webpages previously visited) can be identified by a third party (e.g., a host of a requested website). In one instance, a characteristic pertaining to a referrer field can itself be used as a metric (e.g., a length of the field). In one instance, this feature can be used to filter results centered on another metric. For example, if a metric of interest is the URL length, the events that contribute to analysis of the metric can be filtered to only include events having no referrers or having at least one referrer or even having a specific number of referrers. Thus, the analysis can focus on event data most likely to be concerning for a given situation.

Figure 13:
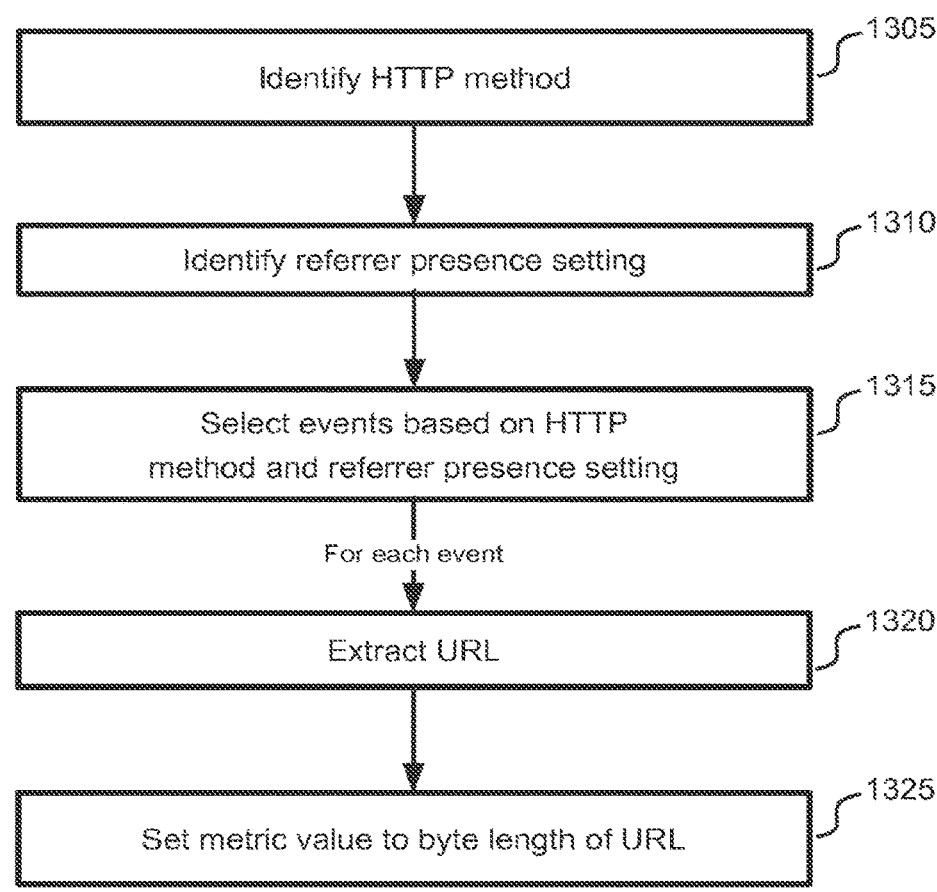
FIG. 13 illustrates a flowchart of an embodiment of a process for setting a metric value to a length of a URL.

FIG. 13 illustrates a flowchart of an embodiment of a process 1300 for setting a metric value to a length of a URL. The metric can then be analyzed as disclosed herein to determine whether and which URL lengths are suspicious and/or requiring action. Process 1300 begins at block 1305, where filter engine 230 identifies an HTTP method. The HTTP method may be identified based on input received via interface engine 225 corresponding to the method. The HTTP method can include, e.g., a GET or POST method.

Filter engine 230 identifies a referrer presence setting at block 1310. Again, the referrer presence setting may be identified based on input received via interface engine 225 corresponding to the setting. The setting can include, e.g., none or direct—indicating that no referrer is detected; or any or routed—indicating that at least one referrer was detected. In some instances, the setting may be set to a specific number of involved referrers.

Filter engine 230 then selects amongst retrieved events to identify those conforming to the identified HTTP method and referrer presence setting at block 1315. These events can then define the set of events for subsequent analysis. Alternatively, a new search may be performed across the event data store 215 to find events with appropriate time stamps, HTTP method and referrer status. The set of events can include events originating from firewall, router, switch or network-flow components and can include proxy or HTTP data.

Field extractor 210/325 extracts a URL from each retrieved event at block 1320. The URL can identify a requested or posted URL. For each retrieved event, data aggregator 235 sets a metric value to a byte length of URL at block 1325. Processing can then continue as described elsewhere herein to allow a client to investigate the values and frequencies of the metrics and determine whether a security threat may exist.

Figure 14:
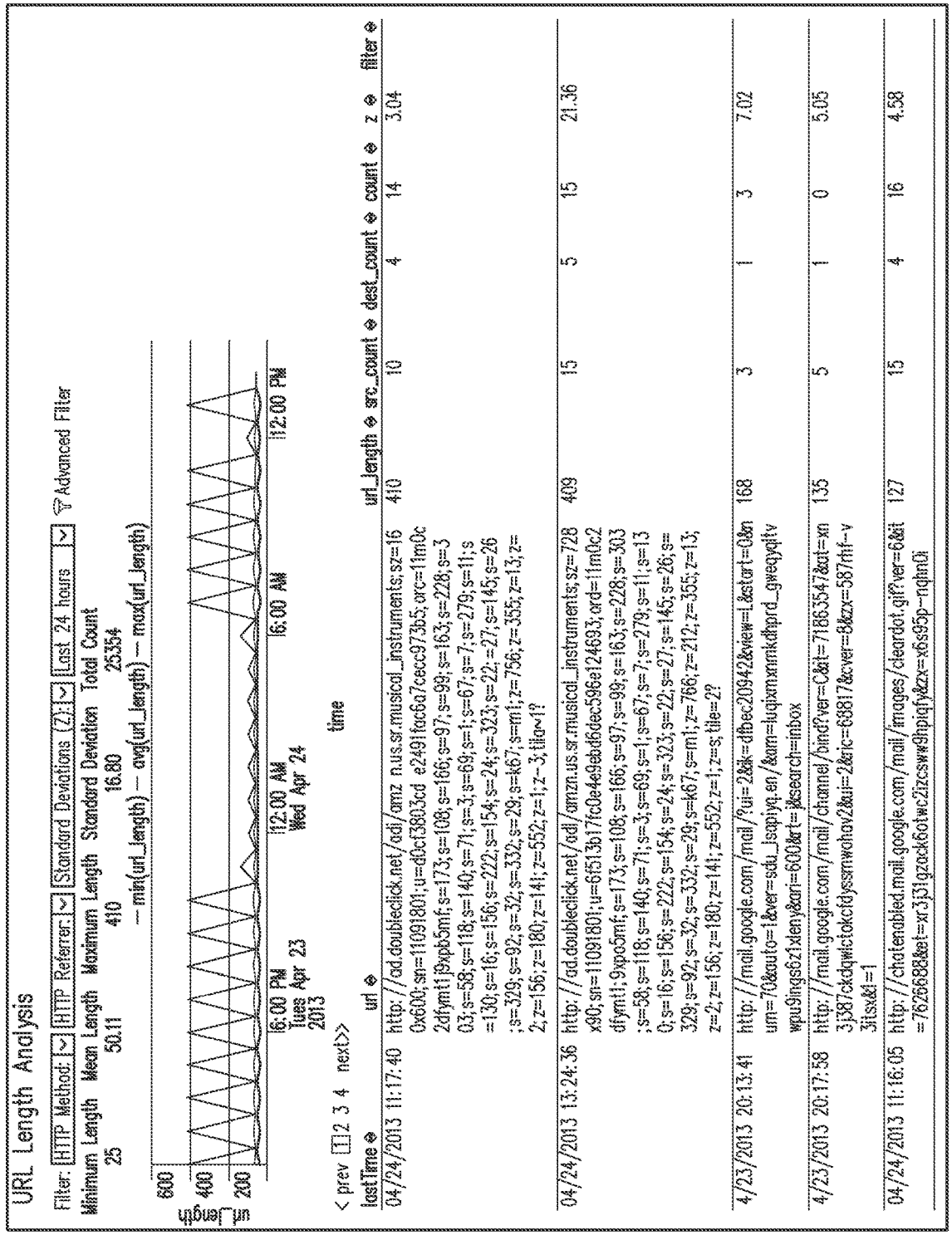
FIG. 14 shows an example of an investigative dashboard showing objects representing URL-length metrics.

FIG. 14 shows an example of an investigative dashboard showing objects representing URL-length metrics. The top plot shows the minimum, average and maximum URL length within the of events in various time bins across a 24-hour period. The bottom table shows specific URLs within the set of events. For each event, the length of the URL, a source count, a destination count, a total count, and a Z-score calculated based on the length is also shown. In this particular instance, no subset variable, HTTP method or referrer type has been set, so the objects represent all events in the set of events One example of a metric is a variable characterizing a user-agent string. These strings can be included in HTTP requests (e.g., GET requests) and identify compatible software on a local host, such as a browser used for online access, browser compatibility, and an operating system. Typically, this information can be used to allow hosts to tailor which content objects are provided in response to the request. However, the strings can also expose malware, viruses and other security threats. Such threats can track webpage navigation and character entry, which can expose users to privacy invasion and password exposure. A length of a string can itself be suspicious. A zero-length string can suggest that a threat is attempting to block detection by eliminating the string. Meanwhile, a very long string can also be suspicious, as it can identify hidden tool operation. Further, select substrings in the string can be suspicious, such as profanity, typos or known malware identifiers. Thus, a metric could count a length of a user agent string, a number of profanities, typos, non-technical terms or potential malware identifiers, or a metric could include an overall severity rating based on one or more of these properties (e.g., a combined total of a severity rating of each profanity, a maximum confidence in a presence of a malware identifier, etc.).

Figure 15:
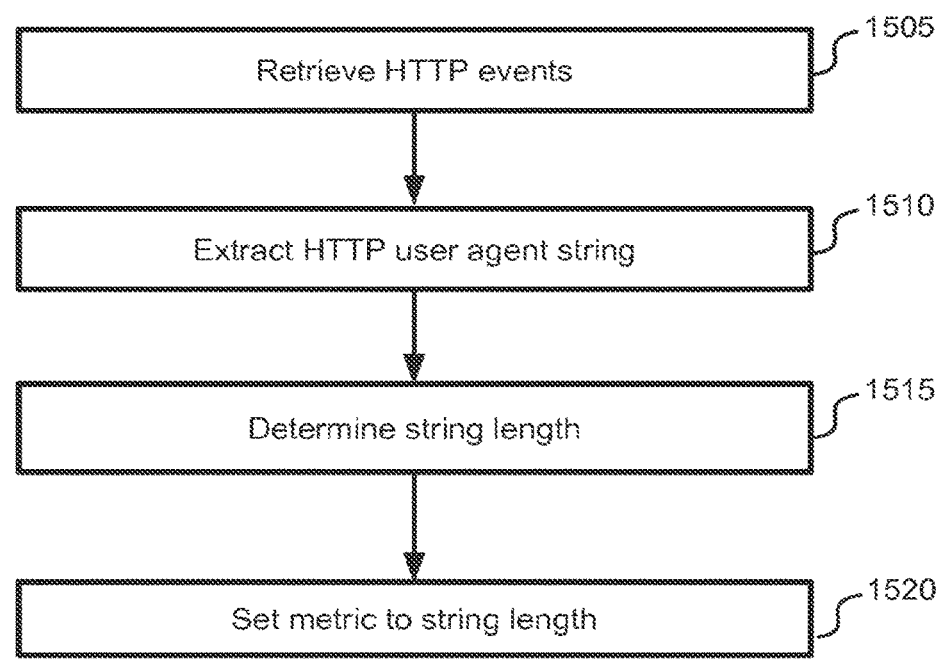
FIG. 15 illustrates a flowchart of an embodiment of a process for setting a metric value to a length of a user agent string.

FIG. 15 illustrates a flowchart of an embodiment of a process 1500 for setting a metric value to a length of a user agent string. Process 1500 begins at block 1505, where search engine 220/340 retrieves HTTP events from event data store 215. Field extractor 210/325 extracts an HTTP user agent string from each event at block 1510. For each event, data aggregator 235 determines a byte length of the string at block 151 and sets a metric value to the byte length at block 1520. Clients can then use processes disclosed herein to investigate the user agent string lengths. Subset-criterion variables may be appropriately set to examiner data concentrating on long strings, as they can be suggestive of a security problem. Examples of an investigative dashboard showing objects representing agent-string metrics are shown in FIGS. 8A-8C.

As mentioned above, length of URLs and/or user agent strings can be indicative of security threats, but so can inclusion of particular types of substrings (e.g., misspellings, profanity or old version identifiers). Thus, another type of metric could assess whether URLs or user agent strings include suspicious substrings.

Figure 16:
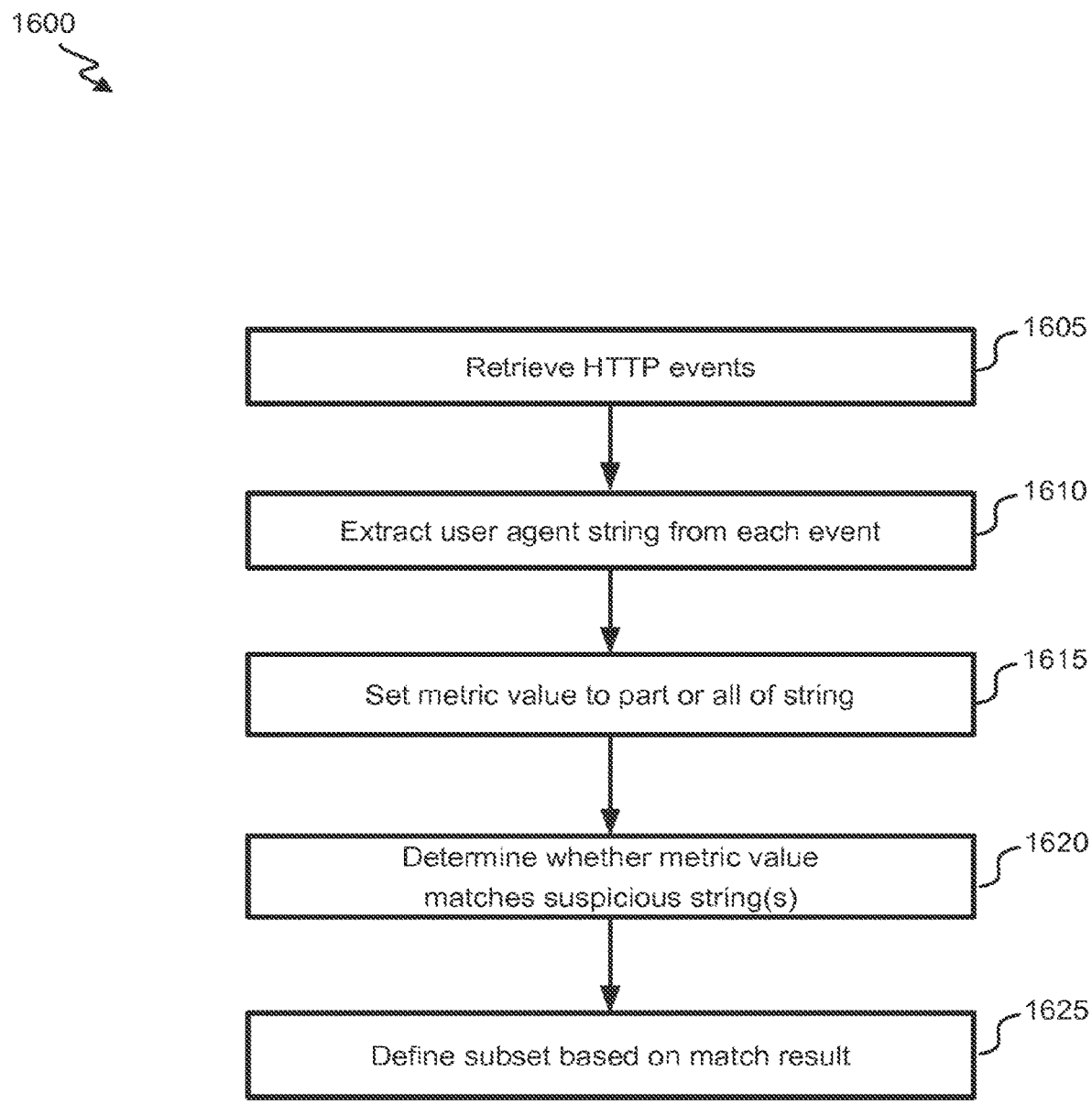
FIG. 16 illustrates a flowchart of an embodiment of a process for setting a metric value based on a substring included within a string.

FIG. 16 illustrates a flowchart of an embodiment of a process 1600 for setting a metric value based on a substring included within a string. In the particular depicted embodiment, process 1600 is shown pertaining to analysis of a user agent string. It will be appreciated that a similar process may apply to other strings in events (e.g., a URL). Process 1600 begins at block 1605, where search engine 220/340 retrieves a set of HTTP events. For each event in the set, field extractor 210/325 extracts a user agent string from the event. Data aggregator 235 then sets metric value to part or all of string. For example, the part can include a token within a string, a version number, characters at specific points in the string (e.g., characters 25-30), or some or all numeric characters.

Subset engine 245 determines whether metric value matches suspicious strings. Suspicious strings can include ones defined based on input originating from a client and/or stored strings. For example, a client may type in strings of interest. In some instances, an input corresponds to an identification of a category of suspicious strings of interest (e.g., profanity, old version or misspellings), and subset engine 245 then collects common strings within the category. In some instances, a suspicious string is a lack of a string. For example, if a referrer is missing from an event, or if a source identifier is undetected, malware may have been operating to remove this information in an attempt to remain undetected (or internal privacy-control efforts may have triggered the result). Thus, in some instances, a suspicious string is an empty or undetected string. Subset engine 245 defines subset of events to include those events corresponding to metric values that positively matched a suspicious string.

One example of a metric is a variable characterizing traffic size. For example, a high count or frequency of requests (e.g., POST or GET requests) can be suspicious. It can, e.g., suggest that malware is successively attempting to guess login information. A metric attempting to characterize this situation can operate by, e.g., retrieving all HTTP requests with timestamps in a time period and having a similarity, such as a same IP address. Alternatively, traffic-sensitive events, such as output from a packet analyzer (e.g., Wireshark or tcpdump) or access log files (e.g., apache access log file). A traffic-size metric value (e.g., counting requests) can be included in or derived from a single packet-analyzer-output or access-log event. Because the traffic-size metric pertains to multiple requests, a first part in determining the metric can include identifying traffic conditions of interest. For example, the traffic-size analysis can be conducted on a basis specific to one, more or all IP addresses (or portions thereof), domain names, or URL strings or URL substrings in a set of events.

Figures 17, 19A:
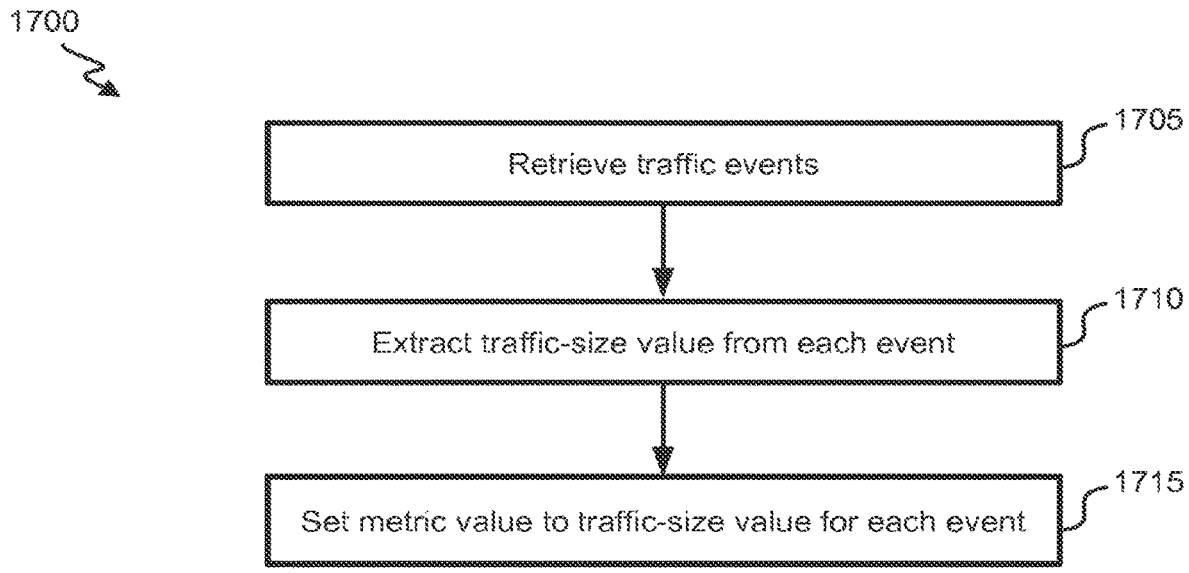
FIG. 17 illustrates a flowchart of an embodiment of a process for setting a metric value to a traffic-size value.
FIG. 19A illustrates a flowchart of an embodiment of a process for setting a metric value to a number of URL categories.

FIG. 17 illustrates a flowchart of an embodiment of a process 1700 for setting a metric value to a traffic-size value. Process 1700 begins at block 1705, where search engine 220/340 retrieves traffic events from event data store 215. Field extractor 210/325 extracts a traffic-size value from each event at block 1710. For each event, data aggregator 235 sets a metric value to the traffic-size value.

In this particular instance, the retrieved events will themselves include a variable identifying a traffic volume. In another instance, search engine 220/340 can retrieve access events. Field extractor 210/235 can determine a time for each event. Data aggregator 235 can then determine a metric based on a count of related events (e.g., coming from a same source or over a same router) within a particular time period. Thus, data aggregator 235 can operate to generate a meta event value.

Figure 18A:
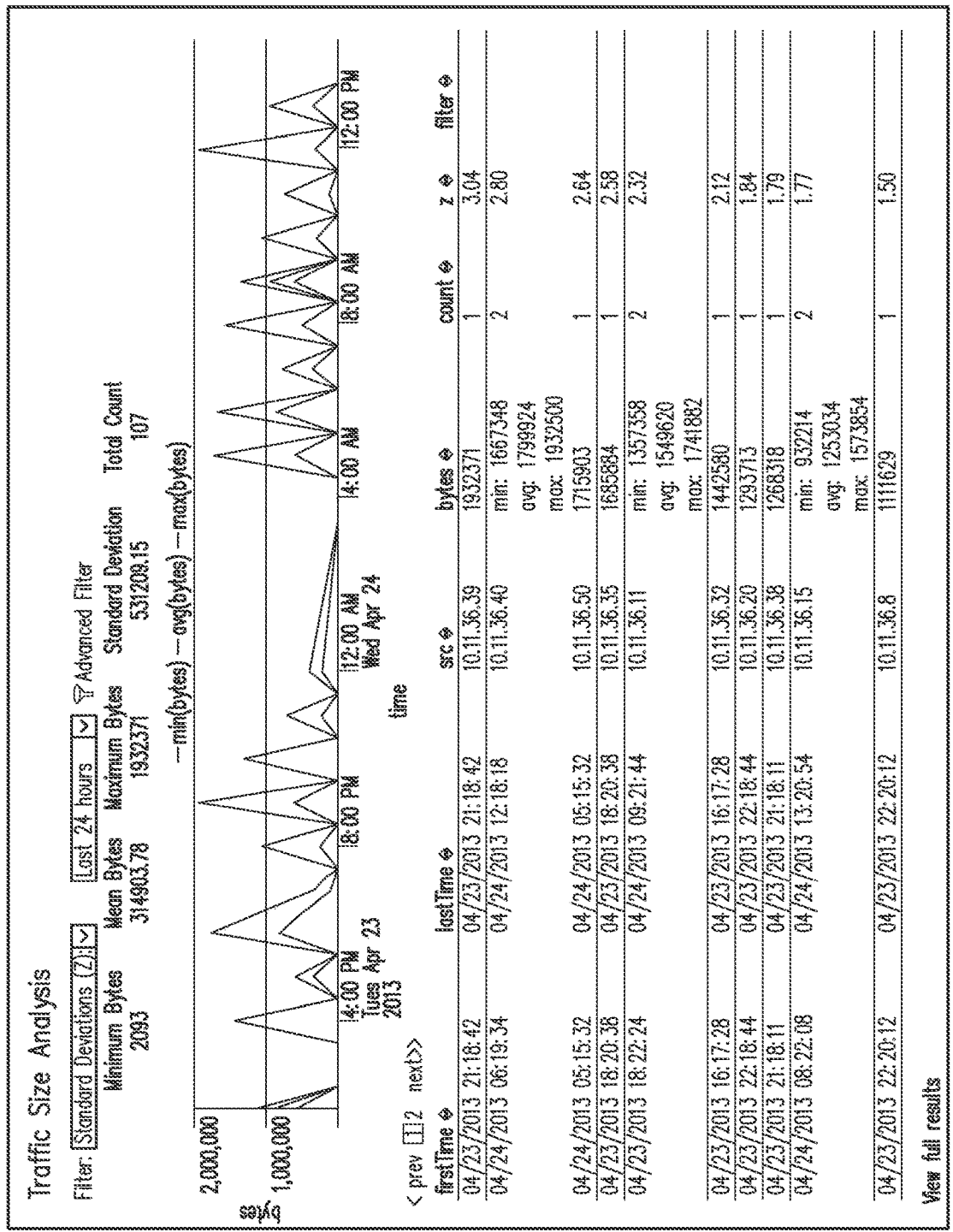
FIG. 18A shows an example of an investigative dashboard showing objects representing traffic-volume metrics.

FIG. 18A shows an example of an investigative dashboard showing objects representing traffic-volume metrics. The top graph shows three lines, one of which shows a minimum number of bytes in a time bin, one showing the average and one showing the maximum. The bottom table includes a row summarizing traffic events from a given source. The table shows, in each row, the first and last times that a traffic event was seen, a source IP address, a total number of bytes, a total number of events, and a Z-score for the event. Each row also shows a minimum, average and maximum number of bytes for the traffic event. Thus, a client will be able to see if one source is tied to many traffic events and/or large traffic volumes.

A client can drill into the data shown in the object. For example, clicking on a row in the table can add a supplemental table to the table shown in FIG. 18A. FIG. 18B shows an expanded table with details for specific traffic events contributing to a summarized traffic event shown in the table from FIG. 18A. In FIG. 18B, the outlined bottom table includes events contributing to the highlighted row in the top table. The bottom table identifies the most recent traffic event, an action associated with the event (e.g., allowed or blocked), source and destination IP addresses, the transport protocol used (e.g., udp or tcp), the destination port number, the total number of bytes, and the total number of traffic events.

One example of a metric is a variable characterizing HTTP categories. URLs can be categorized (within a security monitoring system or by an external service) using a finite set of categories (e.g., news, education, games, health, etc.). The categories can include security-pertinent categories, such as malicious source. A metric can then be defined as a category for a URL, a presence or absence of a particular category (e.g., "malicious source") for a URL, or a number of categories. In some instances, such metrics can be used in combination with timestamps to identify access patterns and determine whether, which, how many and to what extent, events with particular categories defy the pattern. For example, if a pattern reveals that news sites are frequently visited in the morning, and event analysis shows a large peak in access to news sites in the middle of the night, a security threat may exist.

FIG. 19A illustrates a flowchart of an embodiment of a process 1900a for setting a metric value to a number of URL categories. Process 1900a begins at block 1905, where search engine 220/340 retrieves HTTP events. Field extractor 210/325 extracts all URL categories from each event. Data aggregator 235 sets a metric value to the number of categories. In an alternate embodiment, the metric value could be set to the actual category, and subset engine 245 could then determine whether the category matches a suspicious category. The suspicious category can be identified based on set properties, based on an input corresponding to an explicit identification of the suspicious category or an input corresponding to a selection of the suspicious category.

Figure 19B:
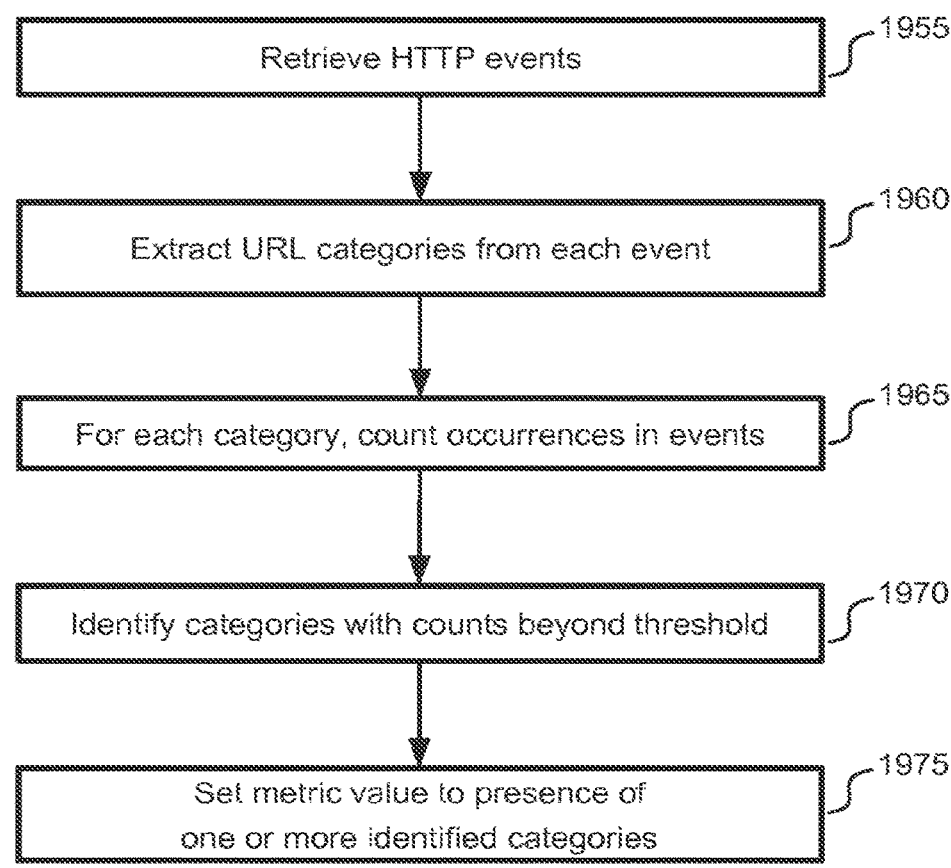
FIG. 19B illustrates a flowchart of an embodiment of a process for setting a metric value to a presence of a URL category having particular cross-event occurrence characteristics.

FIG. 19B illustrates a flowchart of an embodiment of a process 1900b for setting a metric value based on a detection of a URL category. Process 1900b begins at block 1955, where search engine 220/340 retrieves HTTP events. Field extractor 210/325 extracts all URL categories from each event.

For each category extracted from an event, data aggregator 235 counts from how many events the category was extracted at block 1965. Low or high counts may be suggestive of a security threat. Thus, a lower and/or upper threshold may be set. At block 1970, data aggregator 235 identifies categories with counts below a lower threshold and/or counts above an upper threshold. At block 1975, data aggregator 235 sets a metric value to whether an identified category was present in an event. In one instance, the metric value is set to a number of identified categories present in an event. In one instance, a set of metric values is generated for each event
each metric value in the set corresponding to an identified category and indicating whether the category was present. In one instance, one metric value is set based on whether a category with counts below a lower threshold is detected in an event (or a count of such categories) and another metric value is set based on whether a category with counts above an upper threshold is detected in an event (or a count of such categories).

Figure 20:
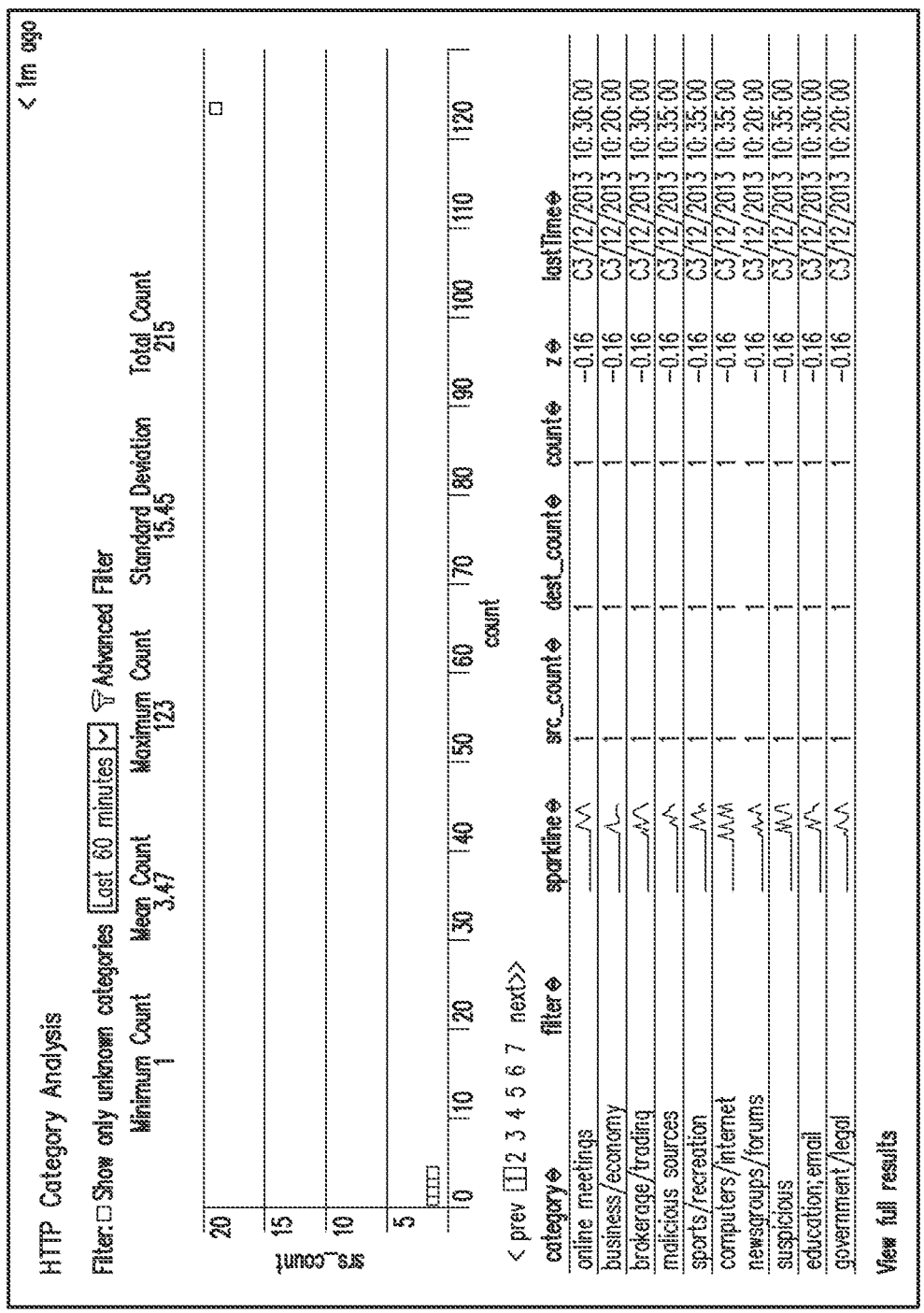
FIG. 20 shows an example of an investigative dashboard showing objects representing URL-category metrics.

FIG. 20 shows an example of an investigative dashboard showing objects representing URL-category metrics. In the top scatter plot, each point represents a category. The x-axis represents how many times the category appeared in analyzed events, and the y-axis represents a number of unique sources for those events. This plot shows that a filter can be applied such that only unknown categories are represented in the plot. The unknown categories can include categories defined by a client. For example, a client can indicate that a category named "Not detected" (indicating that the URL has no associated categories) is to be treated as an unknown category.

In the bottom table, each row corresponds to a category. The row includes a name of the category, a sparkline showing temporal detection of events including the category, a number of sources, a number of destinations, a total count of events for the category, a variance from the average of the category count in the data set and a percentage indicating a portion of data that would be excluded by using that number of standard deviation as a filter, and a timestamp for the most recent event for the category.

Figure 21:
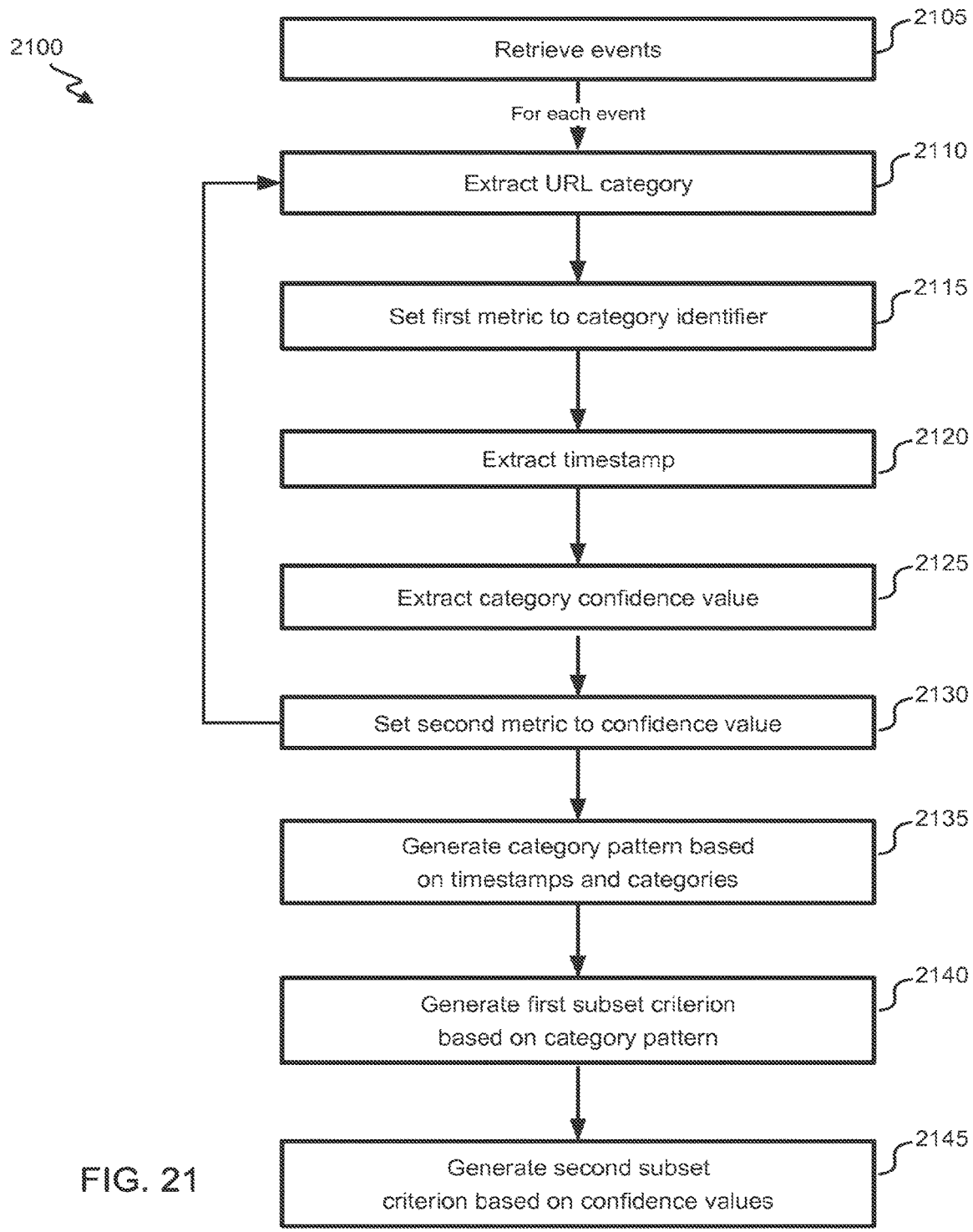
FIG. 21 illustrates a flowchart of an embodiment of a process for generating a subset criterion based on a pattern and for utilizing two subset criteria.

FIG. 21 illustrates a flowchart of an embodiment of a process 2100 for generating a subset criterion based on a pattern and for utilizing two subset criteria. Process 2100 begins at block 2105, where search engine 220/340 retrieves a set of events, such as traffic events. Blocks 2110-2130 are performed for each event. At block 2110, field extractor 210/325 extracts a URL category from the event. Data aggregator 235 sets a first metric value for the event to an identifier of the category at block 2115. Field extractor 210/325 extracts a timestamp from the event at block 2120. Field extractor 210/325 further extracts a value characterizing a confidence of the URL category at block 2125. Data aggregator 235 sets a second metric value for the event to the confidence value. Thus, two metrics are determined for each event.

Using the timestamps and categories, subset engine 245 can determine a pattern of categories at block 2135. For example, subset engine 245 could detect that individual sources frequently go to an email site in the morning prior to logging into a banking site. Thus, for each of one or more categories, a pattern can indicate a probability that a previously or subsequently visited site was of particular other categories. Then, for example, if it is subsequently detected that a source visited consecutive banking sites, the generated category pattern may indicate that the particular pattern is not common. Subset engine 245 can then generate a first subset criterion based on category pattern. For example, the criterion can include a threshold pattern probability. Then, for example, if it is determined that probability of observing a sequence of accessing a first webpage of a first category and next accessing a second webpage of a second category is below the threshold probability, the event pertaining to the first and/or second access can be included in the subset of events.

At block 2140, subset engine 245 generates a second subset criterion based on the event confidence values. For example, the subset engine 245 may indicate that in order to include an event in a subset of events based on satisfaction of the first subset criterion, a confidence of the categorization of a first and/or second webpage must be above a threshold. Thus, in process 2100, multiple subset criteria must be satisfied in order for an event to be included in the subset. Further, the subset-inclusion evaluation includes analyzing multiple events.

Several embodiments disclosed herein indicate that a two-dimensional data object can be generated. For example, a scatter plot can compare a metric value to an occurrence count. It will be appreciated that, in some instances, the object can represent more than two dimensions. For example, a third dimension can identify a number of source or destination identifiers, a number of systems involved, a number of network system on which pertinent events are appearing on, a number of business units associated with events giving rise to the metric value, a destination count, or an event severity code (e.g., based on population separation and/or classification certainty). Such other dimensions could be added in additional table columns. For visual presentations, a scatter plot could be enhanced such that a size, color, texture, and/or animation of individual points represents a value of another dimension.

It will also be appreciated that disclosed embodiments could be extended to allow a client to identify a specific metric value involved in white- or blacklisting. A client can interact with a dashboard to indicate that a particular metric value is acceptable (e.g., possibly based on his knowledge that internal operations give rise to the value), thereby "whitelisting" the value. Subsequently, even if the value leads to subset criterion satisfaction, the value may be omitted from objects representing the subset. Depending on the embodiment, the whitelisted values may or may not continue to contribute to determination of a population characterization.

Conversely, a client can interact with a dashboard to indicate that a particular metric value is not acceptable, thereby "blacklisting" the value. Such an action, depending on the embodiment, could cause the blacklisted value to always be present in a subset regardless of criterion satisfaction (e.g., to remind the client of its presence and count) or to never be present in the subset regardless of criterion satisfaction (e.g., as the client may already know that the value is of concern). In the former case, the blacklisted value may be highlighted relative to other presented values (e.g., in a subset or set) to indicate the confirmed security-concerning characterization of the value. Further, blacklisting a value may cause a rule to be generated which ignores or denies requests from events with the blacklisted value.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers.

The apparatus can include, in addition to hardware, code that creates an execution environment for the computer program in question, e.g., code that constitutes processor firmware, a protocol stack, a data store management system, an operating system, or a combination of one or more of them, A propagated signal is an artificially generated signal, e.g., a machine generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, architecture provider or reviewer, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
    accessing, by a computer system, raw machine data organized as a set of searchable time-stamped events, the raw machine data having been produced by one or more components in an information technology environment and reflecting activity in the information technology environment;
    executing, by the computer system, a search to identify a subset of the set of searchable time-stamped events that satisfy at least one search criterion, to identify potentially security-related events derived from the raw machine data;
    identifying, by the computer system, a set of values that relate to a particular category from the subset of the set of time-stamped searchable events;
    identifying, by the computer system, based on the particular category, one or more patterns among the set of values;
    determining, by the computer system, that a pattern of the one or more patterns is outside of a normal occurrence and indicates a potential security threat, by analyzing values of the identified set of values; and
    causing output of information indicative of the one or more patterns.

2. The method of claim 1, further comprising:
    applying a schema to the set of searchable time-stamped events to impose structure on the raw machine data.

3. The method of claim 1, further comprising:
    while or after identifying the subset of the set of events, applying a schema to impose structure on the raw machine data to the set of searchable time-stamped events.

4. The method of claim 1, further comprising:
    applying, to the set of searchable time-stamped events, a schema that includes a rule defining how to identify a value in the set of values, from an event.

5. The method of claim 1, further comprising:
    applying to the set of searchable time-stamped events a schema that defines how to extract a value in the set of values from an event, wherein the schema includes a regular expression defining how to extract a value in the set of values, from an event.

6. The method of claim 1, applying to the set of searchable time-stamped events a schema that defines how to extract a value in the set of values from an event, including applying a regular expression to the raw machine data included in each event to extract a value in the set of values, from that event.

7. The method of claim 1, wherein the particular category is associated with a field.

8. The method of claim 1, wherein the particular category is associated with a field that can be referenced in a search query by an associated field name.

9. The method of claim 1, wherein the particular category is a metric for measuring performance of a component in the information technology environment.

10. The method of claim 1, further comprising:
identifying, for each value in the subset of values, an event that includes the raw machine data from which that value was identified.

11. The method of claim 1, further comprising:
identifying, for one or more values in the subset of values, one or more events that include the raw machine data from which that value was identified; and
causing display of information relating to the identified one or more events.

12. The method of claim 1, wherein said causing output of information indicative of the one or more patterns comprises:
generating a displayable object indicative of the one or more patterns; and
providing the displayable object to a display device.

13. The method of claim 1, wherein said causing output of information comprises causing graphical display of information relating to the one or more patterns that occur outside the normal occurrence, including display of a multi-dimensional data object.

14. The method of claim 1, wherein said causing output of information comprises causing graphical display of information relating to the one or more patterns that occur outside the normal occurrence, including display of a multi-dimensional data object that includes at least three dimensions.

15. The method of claim 1, wherein said causing output of information comprises causing graphical display of information relating to the one or more patterns that occur outside the normal occurrence, including display of the multi-dimensional data object, the method further comprising:
receiving input reflecting an instruction to display underlying information from which the graphically displayed information was derived;
identifying, for one or more values in the subset of values, one or more events that include the machine data from which that value was identified; and
causing display, based on the received input, of information relating to the identified one or more events.

16. The method of claim 1, wherein the set of values that relate to the particular category are included in one field.

17. The method of claim 1, wherein the at least one search criterion includes a criterion for identifying events that correspond to a predetermined z-score.

18. The method of claim 1, wherein the at least one search criterion includes a criterion for identifying events that exceed a threshold distance from a center of a distribution of metric values in a population.

19. The method of claim 1, wherein the at least one search criterion includes a criterion for identifying events that exceed a threshold distance from a mean or median of a metric-value population.

20. One or more non-transitory computer-readable storage media storing instructions, execution of which by a processor in a processing system causes performance of operations comprising:
accessing raw machine data organized as a set of searchable time-stamped events, wherein the raw machine data has been produced by one or more components in an information technology environment and reflects activity in the information technology environment;
executing a computer-implemented search to identify a subset of the set of searchable time-stamped events that satisfy at least one search criterion, including a time stamp, to identify potentially security-related events derived from raw machine data;
identifying, by the computer system, a set of values that relate to a particular category from the subset of the set of time-stamped searchable events;
identifying, based on the particular category, one or more patterns among the set of values;
determining that a pattern of the one or more patterns is outside of a normal occurrence and indicates a potential security threat, by analyzing values of the identified set of values; and
causing output of information indicative of the one or more patterns.

21. The one or more non-transitory computer-readable storage media of claim 20, said operations further comprising:
applying, to the set of searchable time-stamped events, a schema that includes an extraction rule defining how to extract a value in the set of values from an event.

22. The one or more non-transitory computer-readable storage media of claim 20, wherein the particular category is associated with a field.

23. The one or more non-transitory computer-readable storage media of claim 20, said operations further comprising:
identifying, for one or more values in the subset of values, one or more events that include the raw machine data from which that value was extracted; and
causing display of information relating to the identified one or more events.

24. The one or more non-transitory computer-readable storage media of claim 20, wherein said causing output of information indicative of the one or more patterns comprises:
generating a displayable object indicative of the one or more patterns; and
providing the displayable object to a display device.

25. The one or more non-transitory computer-readable storage media of claim 20, wherein said causing output of information indicative of the one or more patterns comprises:
generating a displayable object indicative of the one or more patterns, wherein the displayable object has at least three dimensions; and
providing the displayable object to a display device.

26. An apparatus comprising:
a data accessor, implemented at least partially in hardware, configured to access raw machine data into a set of searchable time-stamped events, the raw machine data having been produced by one or more components in an information technology environment and reflective of activity in the information technology environment;

an identifier, implemented at least partially in hardware, configured to identify a subset of the set of searchable time-stamped events that satisfy at least one search criterion, to identify potentially security-related events derived from the raw machine data;

a schema device, implemented at least partially in hardware, to identify a set of values that relate to a particular category from the subset of the set of time-stamped searchable events;

a categorizer, implemented at least partially in hardware, configured to identify, based on the particular category, one or more patterns among the set of values;

an analyzer, implemented at least partially in hardware, configured to determine that a pattern of the one or more patterns is outside of a normal occurrence and indicates a potential security threat, by analyzing values of the identified set of values; and an output formatter, implemented at least partially in hardware, configured to cause output of information indicative of the one or more patterns.

27. The apparatus of claim 26, the apparatus being configured to:
apply, to the set of searchable time-stamped events, a schema that includes an extraction rule defining how to extract a value in the set of values from an event.

28. The apparatus of claim 26, wherein the particular category is associated with a field.

29. The apparatus of claim 26, the apparatus being configured to:
identify, for one or more values in the subset of values, one or more events that include the raw machine data from which that value was extracted; and
cause display of information relating to the identified one or more events.

30. The apparatus of claim 26, wherein said causing output of information indicative of the one or more patterns comprises:
generating a displayable object indicative of the one or more patterns; and
providing the displayable object to a display device.

* * * * *